(12) United States Patent
Schlanger

(10) Patent No.: US 9,283,804 B2
(45) Date of Patent: Mar. 15, 2016

(54) VEHICLE WHEEL SPOKE CONNECTION

(71) Applicant: Raphael Schlanger, Wilton, CT (US)

(72) Inventor: Raphael Schlanger, Wilton, CT (US)

(*) Notice: Subject to any disclaimer, the term of this patent is extended or adjusted under 35 U.S.C. 154(b) by 182 days.

(21) Appl. No.: 13/740,888

(22) Filed: Jan. 14, 2013

(65) Prior Publication Data

US 2013/0181503 A1 Jul. 18, 2013

Related U.S. Application Data

(60) Provisional application No. 61/631,796, filed on Jan. 12, 2012.

(51) Int. Cl.
| | | |
|---|---|---|
| B60B 1/00 | (2006.01) | |
| B60B 1/04 | (2006.01) | |
| B60B 21/02 | (2006.01) | |
| B60B 21/06 | (2006.01) | |

(52) U.S. Cl.
CPC .............. *B60B 1/003* (2013.01); *B60B 1/041* (2013.01); *B60B 1/045* (2013.01); *B60B 21/025* (2013.01); *B60B 21/064* (2013.01); *B60B 21/062* (2013.01); *B60B 2900/113* (2013.01); *B60B 2900/351* (2013.01)

(58) Field of Classification Search
CPC ........ B60B 1/044; B60B 1/045; B60B 1/046; B60B 21/064; B60B 21/066
USPC .......... 301/55, 58, 59, 104, 61; 403/353, 248, 403/252, 259, 261; 411/347, 349
See application file for complete search history.

(56) References Cited

U.S. PATENT DOCUMENTS

| | | | | |
|---|---|---|---|---|
| 2,937,905 | A * | 5/1960 | Altenburger | 301/58 |
| 6,536,849 | B1 * | 3/2003 | Okajima et al. | 301/58 |
| 6,776,460 | B1 * | 8/2004 | Lo | 301/58 |
| 6,779,853 | B1 * | 8/2004 | Chang | 301/58 |
| 6,811,228 | B2 * | 11/2004 | Tien | 301/58 |
| 6,890,040 | B2 * | 5/2005 | Chen | 301/58 |
| 6,938,962 | B1 * | 9/2005 | Schlanger | 301/58 |
| 7,192,098 | B2 * | 3/2007 | Okajima | 301/58 |
| 7,434,891 | B2 * | 10/2008 | Tien | 301/58 |
| 8,025,344 | B1 * | 9/2011 | Wang | 301/58 |
| 2005/0110333 | A1 * | 5/2005 | Tien | 301/58 |
| 2008/0048489 | A1 * | 2/2008 | Liu | 301/61 |
| 2008/0054713 | A1 * | 3/2008 | Spahr et al. | 301/58 |
| 2010/0264722 | A1 * | 10/2010 | Teixeira, IV | 301/58 |

* cited by examiner

*Primary Examiner* — Joshua Kennedy

(57) ABSTRACT

A vehicle wheel, comprising: a rim; a hub; a plurality of spokes with a span portion extending between the rim and hub; a bracing element including a hole with a central axis, and an engagement surface; and a connector connected to the bracing element, including an overhang. The bracing element comprises a portion of the rim and/or hub. The connector may be laterally displaced relative to the bracing element between a first lateral position and a second lateral position, where the connector may pass within the hole in the first lateral position and the overhang is engaged to the engagement surface in the second lateral position to limit displacement of the connector. The spoke simultaneously contacts the hole and the connector to maintain the connector in the second lateral position. With the connector in the second lateral position, the spoke is engaged to at least one of the bracing element and the connector to support spoke tension forces.

42 Claims, 17 Drawing Sheets

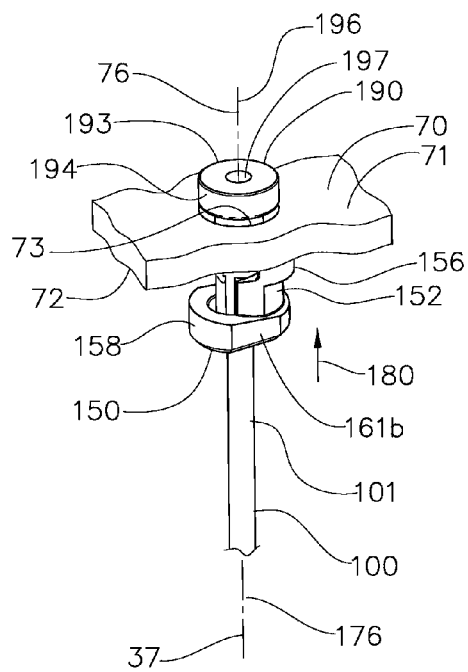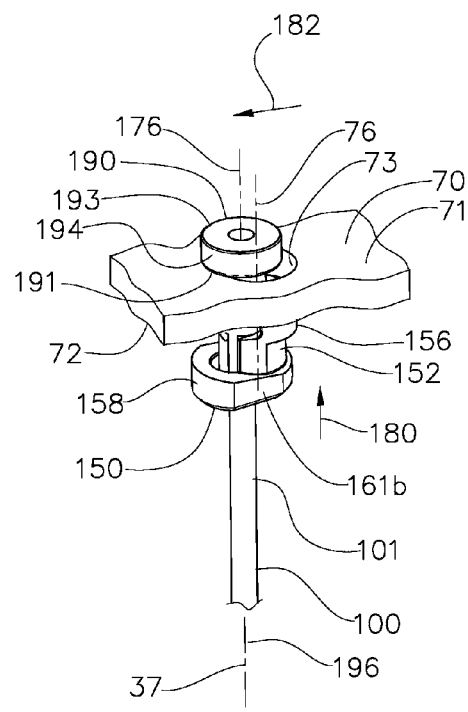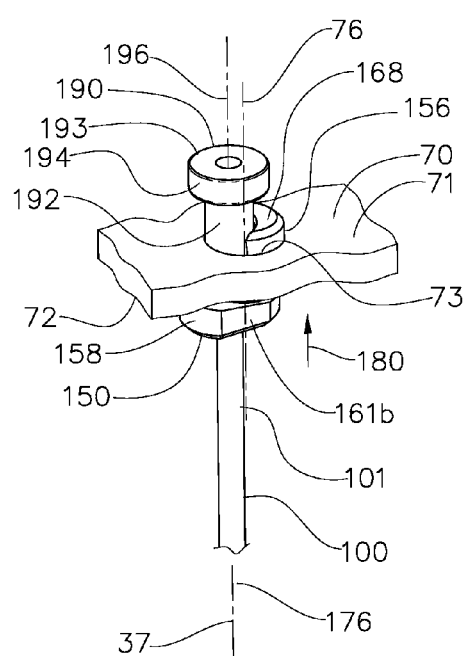
FIG. 5d
FIG. 5e
FIG. 5f

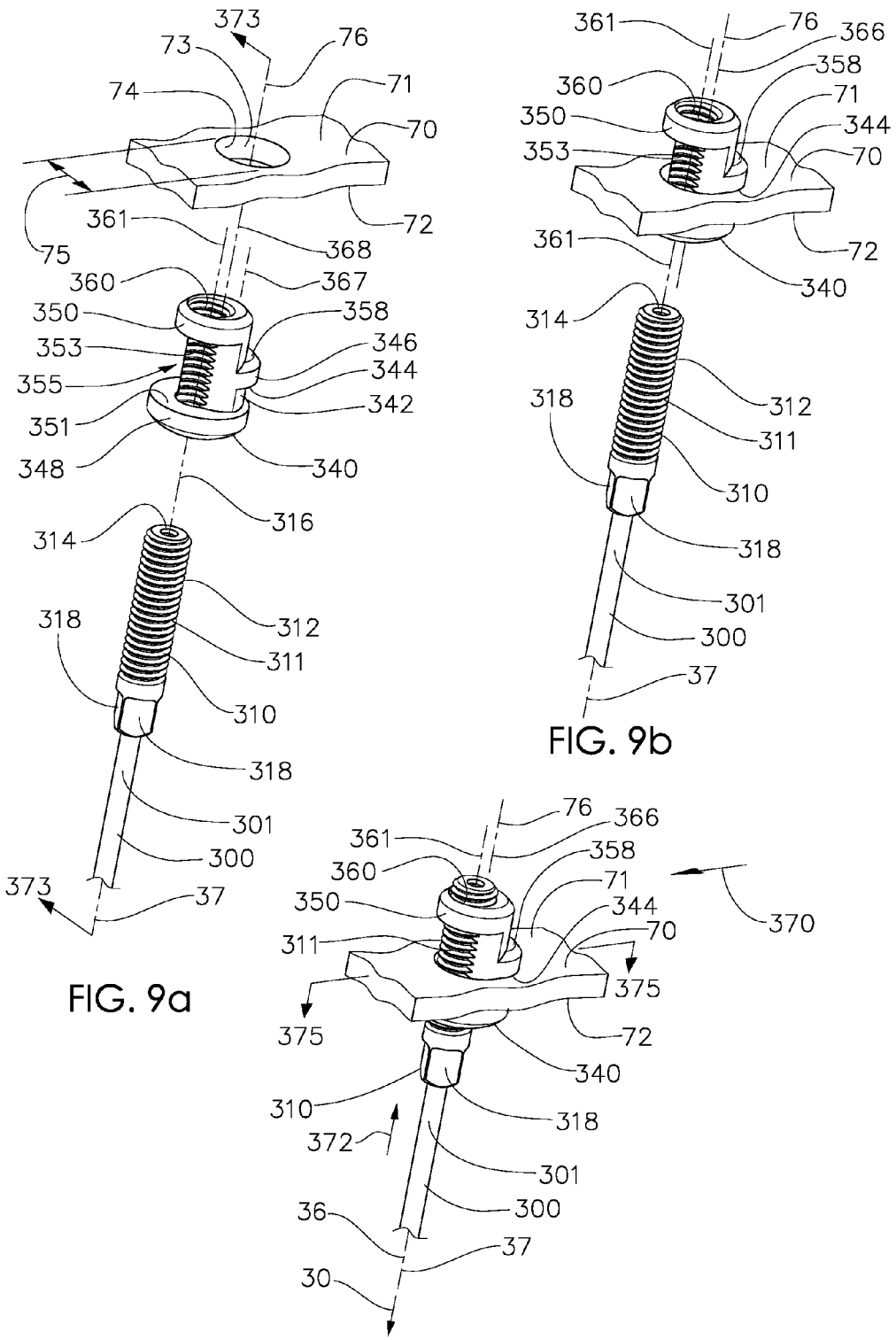

VEHICLE WHEEL SPOKE CONNECTION

CROSS-REFERENCE TO RELATED APPLICATION

This application claims priority of U.S. provisional patent application No. 61/631,796, filed Jan. 12, 2012, and entitled "VEHICLE WHEEL SPOKE CONNECTION".

BACKGROUND OF THE INVENTION (1) Field of the Invention

This invention is related to the means of attachment between the spoke and the rim of a vehicle wheel and between the spoke and hub of a vehicle wheel. This invention is particularly related to the connection of a spoke with a rim structure having a "double-wall" construction.

(2) Description of the Related Art

Bicycle wheel rims have historically been constructed to accept pneumatic tires that are designed to work in conjunction with an inner tube. This is the standard of the industry and is the arrangement that we are all familiar with. In this prior art configuration, the rim's tire bed includes a through-hole that is drilled through for passage of the spoke nipple. In a rim of "single-wall" construction, the spoke nipple bears directly against the rim's tire bed. In a rim of "double-wall" rim construction, the rim has two lateral walls, a tire bed and a spoke bed, with a cavity in between. The rim is drilled through both walls, piercing both the tire bed and the spoke bed, with the spoke bed recessed below the tire bed to accept the spoke nipples. Generally, the spoke is presented through the spoke bed from the inside diameter of the rim and the spoke nipple is presented for attachment to the spoke through the tire bed and from the outside diameter of the rim. With single-wall or double-wall rim constructions, a rim strip is utilized to protect the inner tube from the sharp edges associated with the holes and/or the spoke nipples. With rims of double-wall construction, the rim strip also serves to prevent the inner tube from extruding through the drilled access openings in the tire bed.

With the recent advent of tubeless tire technology for bicycles, where the conventional inner tube is eliminated and the tire's beads are sealed directly against the rim, it is desirable that the tire well be sealed and airtight to prevent air leakage from the tire cavity. This typically involves a rim of double-wall construction where the tire bed wall is sealed while the spoke bed wall is then adapted to accept the spokes. One method for sealing the tire bed is to eliminate the aforementioned spoke access holes in the tire bed. If the tire bed is not pierced for the spokes, then the only hole through the tire bed will be for the tire inflation valve, which may be constructed of rubber and is relatively easy to seal against the tire bed. An example of such a tubeless arrangement is outlined by Lacombe et al. in U.S. Pat. No. 6,443,533, where the tire bed remains unpierced and the spoke bed includes extruded spoke holes that are directly threaded with internal threads to accept special externally threaded spoke nipples.

SUMMARY OF THE INVENTION

The present invention utilizes connecting element that may be blindly inserted through a hole in the spoke bed. The connecting element may be inserted through a hole in the spoke bed and then shifted in a direction generally laterally to the central axis of the hole to engage the edge and/or adjacent surface at the distal end of the hole. Additionally, the spoke, or an intermediate element connected to the spoke, is then shifted generally longitudinally to engage connecting element and also to lock the connecting element in its engaged orientation with the spoke bed. Preferably, the spoke also includes an overhanging surface(s) to engage both the connecting element and the edge and/or adjacent surface at the distal end of the hole. Alternatively, the spoke may included a threaded engagement with the connecting element. This assembly serves to create a firm connection between the spoke and the spoke bed that supports spoke tensile forces. It is noted that the spoke bed constitutes a portion of the rim or hub flange to which the connecting element is attached. As the novelty of a blind connection of the spoke is particularly advantageous in conjunction with rims associated with tubeless tires, most of the embodiments are shown with a "double-wall" rim profile that includes an non-pierced tire bed outward from the spoke bed.

One aspect of the invention involves a method for assembling a wheel. For each of a number of spoke holes in the wheel rim, a spoke and/or spoke nipple and connecting element is inserted radially outward through the spoke hole in the spoke bed (or radially inwardly for a spoke bed associated with a hub). The connecting element is then shifted in a direction generally lateral to the tensile axis such that an overhanging surface of the connecting element engages the edge and/or a surface adjacent the distal end of the hole. In a preferred embodiment, the spoke and/or spoke nipple is shifted laterally (in a direction generally opposed to the aforementioned lateral shift of the connector) such that an overhanging surface of the spoke and/or spoke nipple engages the connecting element and an edge or surface adjacent the distal end of the hole. If a spoke nipple or some other intermediate connecting element is utilized, and if the spoke is not already connected thereto, the spoke may next be connected to the spoke nipple (or intermediate connecting element). If a spoke nipple or some other intermediate connecting element is not utilized, then the spoke is thereby already connected to the spoke bed. In either case, the spoke is now able to support spoke tension.

In an alternate embodiment, the spoke (or an intermediate element connected to the spoke) may be rotated about the longitudinal axis relative to the connecting element to provide engagement with the connecting element, rather than the lateral shift as previously described. In a further alternate embodiment, the spoke (or an intermediate element connected to the spoke) may be threadably engaged to the connector. In various implementations, the connecting element may or may not include a flange, the connecting element may be keyed to the hole, the connecting element may be keyed to the spoke bed surface, the longitudinal axis of the spoke may be parallel to the axis of the spoke hole or may be at an angle to the hole's axis, the connecting element may include an extension.

Another aspect of the invention involves a wheel. The wheel has a rim with a spoke bed having spoke holes and a tire bed radially outboard of the spoke bed and lacking holes aligned with the spoke holes. The rim includes a pair of lateral walls extending radially outward from opposite sides of the tire bed to cooperate with the tire bed to bound a tire well for receiving a tire. Spokes couple the rim to the hub by means of the connecting element. Each connecting element has a first portion extending within an associated spoke hole. A central hole or relief of each connecting element accommodates either an associated spoke or an intermediate element coupled to the associated spoke. The connecting element preferably has a second portion radially outward of the spoke bed and an overhanging surface cooperating with an outward surface of the spoke bed to prevent radial inward movement of the associated spoke and permitting tension in the spoke to be transferred to the spoke bed. In various implementations, the connecting element may consist essentially of a single piece. The spoke or an intermediate element coupled to the spoke may have an overlie engagement with the connecting element. An interlocking threaded engagement between the spoke and connecting element may also be considered to be an overlie engagement. The spoke or an intermediate element coupled to the spoke may serve to maintain the connecting element in its open position and its engagement with the spoke bed.

Another aspect of the invention may involve a wheel rim. The rim has a spoke bed with a number of spoke holes, commonly produced by drilling. A tire bed is radially outboard of the spoke bed and lacks holes aligned with the spoke holes. Lateral walls extend radially outward from opposite sides of the tire bed and cooperate with the tire bed to form a tire well. The rim may be substantially unitarily formed from a light alloy (e.g., aluminum alloy) or a fiber composite. A clincher tire may be mounted in the tire well advantageously in the absence of a separate tube. A valve may be sealingly mounted in a valve hole in the tire bed and extending through a valve hole in the spoke bed for inflating the tire.

BRIEF DESCRIPTION OF THE DRAWINGS

The present invention will be more readily understandable from a consideration of the accompanying drawings, wherein:

FIG. 5b is a perspective view, of the connector of the embodiment of FIG. 5a;

FIG. 5d is a partial exploded perspective view of the embodiment of FIG. 5a, describing a second assembly step between the connector and the spoke bed, with the head of the nipple extending through the hole of the spoke bed;

FIG. 5e is a partial exploded perspective view of the embodiment of FIG. 5a, describing a third assembly step, with the transition surface of the nipple advanced outwardly beyond the spoke bed and the spoke nipple and connector shifted laterally relative to the hole;

FIG. 5f is a partial exploded perspective view of the embodiment of FIG. 5a, describing a fourth assembly step, with the offset portion of the connector advanced to be located within the hole;

FIG. 5i is an exploded cross section view, taken along 148-148, of the embodiment of FIG. 5a and corresponding to FIG. 5a;

FIG. 8a is a partial exploded perspective view of a fourth embodiment of the present invention, describing a blind connection between the spoke and the spoke bed, including a connector and spoke nipple;

FIG. 8b is a perspective view of the connector of the embodiment of FIG. 8a;

FIGS. 8c-d are perspective views of the nipple of the embodiment of FIG. 8a;

FIG. 8j is an exploded cross section view, taken along 236-236, of the embodiment of FIG. 8a and corresponding to FIG. 8a;

FIG. 8p is a cross section view, taken along 236-236, of the embodiment of FIG. 8a and corresponding to FIG. 8i;

FIGS. 9a-j describe a fifth embodiment of the present invention, showing a sleeve with external threads engaged to internal threads of the connector.

FIG. 9a is a partial exploded perspective view of a fifth embodiment of the present invention, describing a blind connection between the spoke and the spoke bed, including a connector and sleeve;

FIG. 9b is a partial exploded perspective view of the embodiment of FIG. 9a, describing an earlier assembly step between the spoke, the sleeve, the connector and the spoke bed, with the spoke preassembled to the sleeve and with the connector preassembled to the spoke bed;

FIG. 9c is a partial exploded perspective view of the embodiment of FIG. 9a, describing a final assembly step, with the sleeve threadably assembled to the connector;

FIG. 9d is a cross section view, taken along 373-373, of the connector of the embodiment of FIG. 9a FIG. 9e is an exploded cross section view, taken along 373-373, of the embodiment of FIG. 9a with the connector positioned to correspond to FIG. 9a;

FIG. 9f is a cross section view, taken along 373-373, of the embodiment of FIG. 9a, showing a first assembly step, with the connector longitudinally advanced toward the spoke bed, showing the pilot portion positioned within the hole;

FIG. 9g is a cross section view, taken along 373-373, of the embodiment of FIG. 9a, showing a second assembly step, with the connector laterally shifted and then further longitudinally advanced toward the spoke bed, showing the offset portion positioned within the hole;

FIG. 9h is an exploded cross section view, taken along 373-373, of the embodiment of FIG. 9a, showing a third assembly step corresponding to FIG. 9b, with the connector further longitudinally advanced and then laterally shifted to an overlie engagement between the overhang and the outward surface, including the spoke preassembled to the sleeve;

FIG. 9i is a cross section view, taken along 373-373, of the embodiment of FIG. 9a, showing a fourth assembly step corresponding to FIG. 9c;

FIG. 9j is a cross section view, taken along 375-375, of the embodiment of FIG. 9a, showing the fourth assembly step corresponding to FIG. 9c;

DETAILED DESCRIPTION OF THE INVENTION

Figure 1:
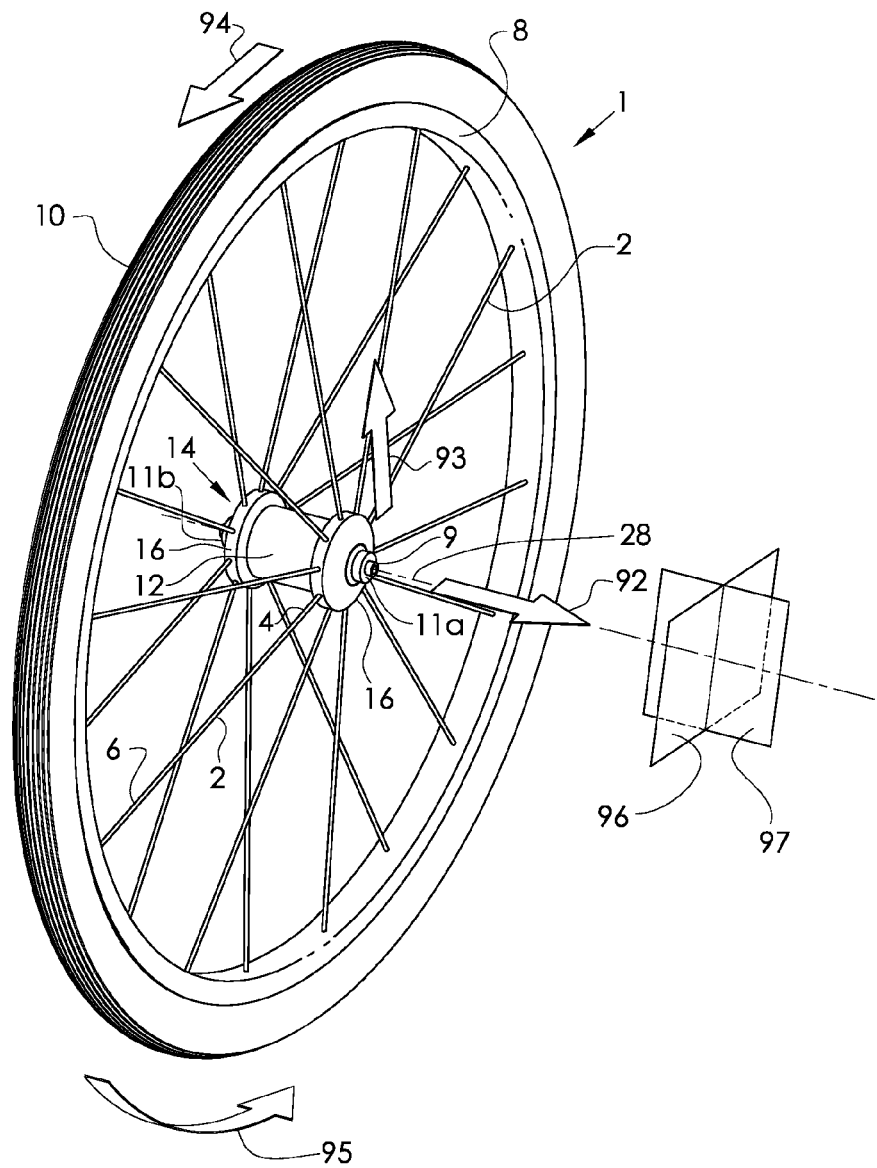
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the frame and the quick release skewer assembly are not shown in this figure. The hub shell 14 is rotatable about the axle 9 and includes at least two axially spaced hub flanges 16, each of which include a means for connecting with the spokes 2. Axle 9 includes end faces 11a and 11b that define the spacing of its mounting with the frame (not shown). The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An axially inboard orientation is an orientation that is axially proximal to the axial midpoint between the two end faces 11a and 11b. Conversely, an axially outboard orientation is an orientation that is axially distal to the axial midpoint between the two end faces 11a and 11b. A radially inboard orientation is an orientation that is radially proximal to the axial axis 28 and a radially outboard orientation is an orientation that is radially distal to the axial axis 28. An axially inwardly facing surface is a surface that faces toward the axial midpoint between the two end faces 11a and 11b. Conversely, an axially outwardly facing surface is a surface that faces away from the axial midpoint between the two end faces 11a and 11b.

While it is most common for the hub shell 14 to rotate about a fixed axle 9, there are some cases where it is desirable to permit the axle 9 to be fixed with the wheel 1 such as the case where the wheel 1 is driven by the axle 9.

For general definition purposes herein, an "integral" joinder is one that is integrated and may not be easily disassembled at the service temperature without damaging at least one of the components that are joined or is difficult to disassemble or is otherwise not meant to be disassembled. This integral joinder involves a joining interface directly between two components. This joining interface is often a welded or adhered interface or some other interface where the two joining surfaces are solidly joined to each other to create a unified structure. Preferably this joining interface is a surface interface, rather than a point interface. The integral joinder is in contrast to a fastened joinder, where such a fastened joinder relies solely on a mechanically interlocked engagement to secure or connect the two components to each other. The term "integral" refers to two portions that are unitary, monolithic and/or integrally joined. Further, when two portions are considered "integral" with each other, they may be integrally joined or may be monolithic or otherwise combined as a singular element.

Figure 2A:
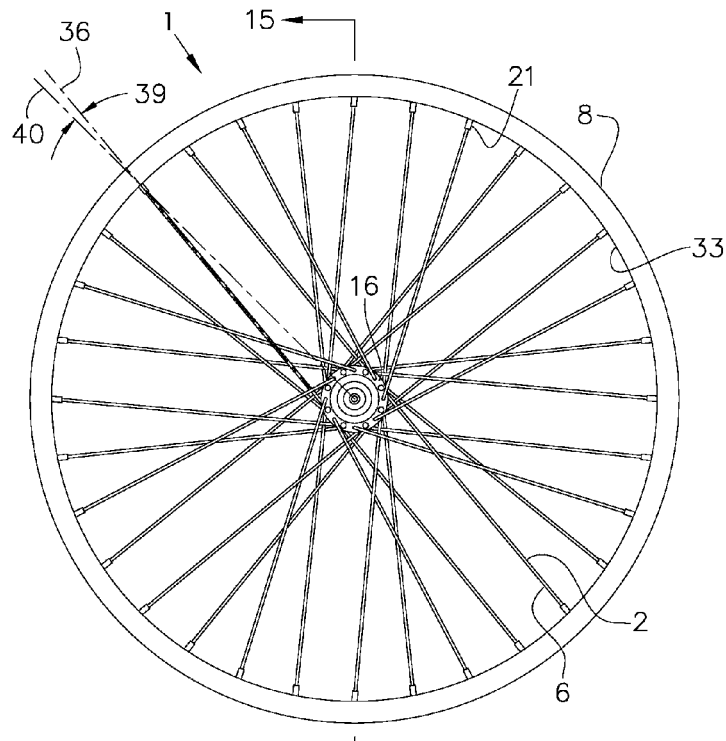
FIG. 2a is an axial plan view illustrating a prior art bicycle wheel.
Figure 2B:
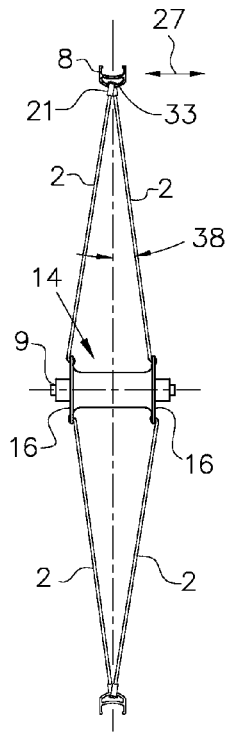
FIG. 2b is a cross-section view of the prior art bicycle wheel of FIG. 2a, as seen generally in the direction 15-15.
Figure 2C:
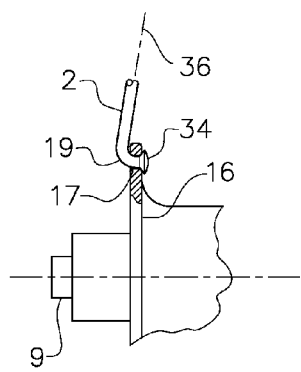
FIG. 2c is a fragmentary view detailing the view illustrated in FIG. 2b where the hub flange is shown in a partial cross-section to illustrate the connection with the spoke.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16. The second end 6 of each spoke 2 is then fixed to the spoke bed 33 of rim 8 via spoke nipples 21. Tightening the threaded engagement between the spoke nipple 21 and the spoke 2 serves to effectively shorten the length of the spoke 2. Thus, as the nipples 21 are threadably tightened, the spokes are drawn up tight and a degree of pre-tension is induced in the spoke 2. By selectively adjusting this threaded engagement, the spoke pre-tension may be adjusted to align the trueness of the rim 8. The spoke pre-tension is resisted by circumferential compression of the rim 8 and it is this balance of forces that imparts efficient structural integrity to the bicycle wheel 1. Also shown in FIG. 2b is bracing angle 38 between the radial centerline plane of the rim 8 and the tensile axis 36 of the spokes 2. As this bracing angle 38 is increased, the lateral stiffness (i.e. stiffness in the axial direction 27 of the wheel 1 is also increased. Also shown in FIG. 2a is bias angle 39 between the tensile axis 36 and a true radial axis 40 as viewed in the plan view of FIG. 2a. The bracing angle 38 and the bias angle 39 combine to help define the inclination angle that the spoke 2 approaches the rim 8 and hub flange 16.

Figure 3A:
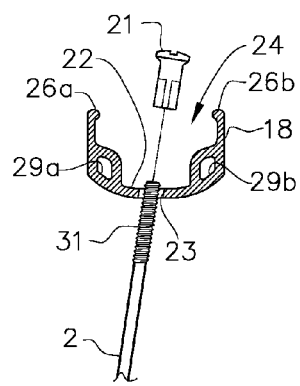
FIG. 3a is a partial cross-sectional view of a prior art single-wall rim.

FIG. 3a shows prior art single-wall rim 18 with a single lower web or spoke bed 22 wall. Rim 18 includes two hooked flanges 26a and 26b for capturing the bead of a tire (not shown). Tire well 24 is a circumferential channel bounded by spoke bed 22 and flanges 26a and 26b. Spoke 2 includes threaded end 31 for threadable engagement with spoke nipple 21. Rim 18 may be produced as an aluminum extrusion that also includes cavities 29a and 29b to accept pins (not shown) that serve to join the butted ends of the extruded profile to create a continuous rim hoop. During assembly, the threaded end 31 of spoke 2 is first positioned to extend through the inside diameter end of opening 23. Next, the nipple 21 may be threadably assembled to the threaded end 31 of the spoke 2 through the outside diameter end of opening 23. With all of the spokes 2 of the wheel assembled to the rim 18 in this way, a completed wheel assembly 1 is achieved.

Figure 3B:
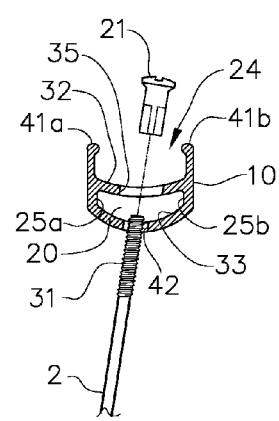
FIG. 3b is a partial cross-sectional view of a prior art double-wall rim.

FIG. 3b shows a rim 20 of double-wall configuration with an upper web or tire bed 32 wall and a lower web or spoke bed 33 wall. Rim 10 includes two hooked flanges 41a and 41b for capturing the bead of a tire (not shown). Tire well 24 is a circumferential channel bounded by tire bed 32 and flanges 41a and 41b. Spoke bed 33 includes opening 42 and tire bed 32 includes concentric opening 35, which serve to accept a spoke 2 and spoke nipple 21. Spoke 2 includes threaded end 31 for threadable engagement with spoke nipple 21. Rim 18 is produced as an aluminum extrusion that also includes an internal cavity 20 bounded by the spoke bed 33, the tire bed 32 and sides 25. It may be seen that, during assembly, the threaded end 31 of spoke 2 is first positioned to extend through the inside diameter end of opening 35. Next, the nipple 21 is threadably assembled to the threaded end 31 of the spoke 2 first through opening 35 and then through opening 42. With all of the spokes 2 of the wheel assembled to the rim in this manner, a completed wheel assembly is achieved. It may be seen that, with the nipple 21 bearing against the spoke bed 32, opening 35 remains exposed as a passageway between the tire well 24 and the cavity 20.

Figure 4:
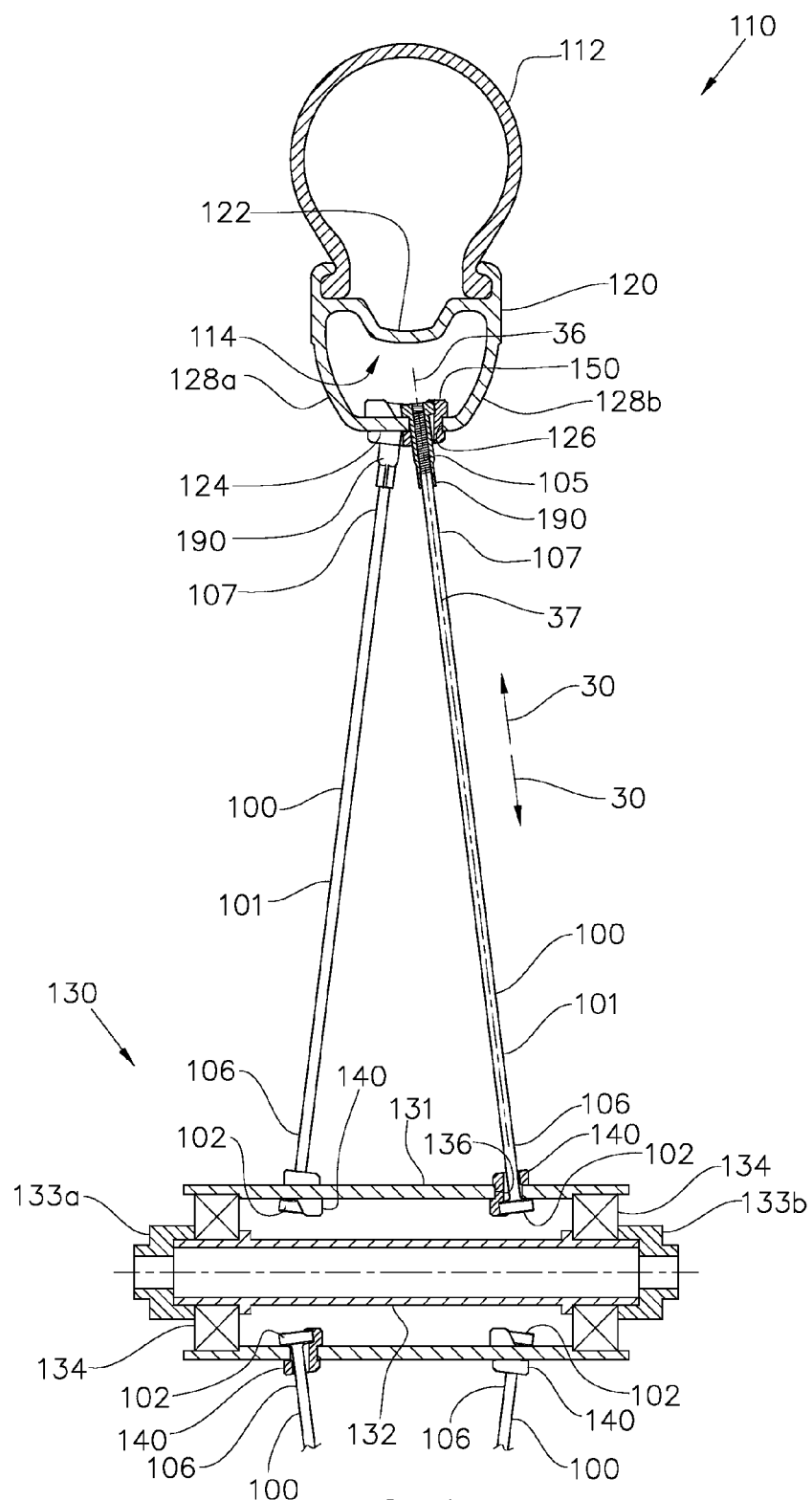
FIG. 4 is a partial cross-section view in the axial plane of a bicycle wheel, including an exemplary application of the present invention utilizing connectors to connect the first end of the spokes to the hub and connectors to connect the second end of the spokes to the rim.

FIG. 4 shows an exemplary bicycle wheel 110 that corresponds to some of the embodiments described herein. This figure is shown to provide a generic assembly to illustrate an arrangement wherein the present invention may be adapted to utilization in bicycle wheel construction and to show that the connector of the present invention may be utilized to provide connection between the spoke and the rim and/or between the spoke and the hub. The bicycle wheel 110 includes spokes 100, rim 120, hub assembly 130 and tire 112. The hub assembly 130 includes hub shell 131, axle 132, axle caps 133a and 133b and bearings 134. The rim 120 includes tire bed 122 wall with geometry for mounting of a tire 112 and a spoke bed 124 wall with a multiplicity of spoke holes 126, each to accept an individual connector 150, and sidewalls 128a and 128b to define a radially extending gap or cavity 114. The tire bed 122 serves to support the tire 112 and/or the pneumatic pressure associated with the tire 112. Commonly, the tire bed 122 supports the inner tube associated with the tire or, in the case of a tubeless tire, may provide a sealing barrier to maintain pneumatic pressure within the tire.

Hub shell 131 includes a multiplicity of spoke holes 136, each to accept an individual connector 140. Spoke 100 includes a shank portion 101 and a head 102 in the region of first end 106 and external threads 105 in the region of second end 107.

It is noted that the rim 120 and hub shell 131 shown here are each exemplary representations of a bracing element that may take on a wide range of forms. The spokes 100 are connected at their first end 106 to the hub shell 131 and at their second end 107 to the rim 120. Spokes 100 are connected to the rim 120 by means of spoke nipples 190 and connectors 150 as described in greater detail in FIGS. 5a-p and in other embodiments described herein. Spokes 100 are connected to the hub shell 131 by means of an overlie connection between a spoke head 102 and connectors 140 as described in greater detail in FIG. 6 and other embodiments described herein.

The spoke 100 is a generally long slender tensile element with a longitudinal axis 37 along its length and generally parallel to its sidewalls. The spoke 100 also has a tensile axis 36 of applied tensile load 30, which is generally collinear to the longitudinal axis 37. For the purposes of definition, the term "longitudinal" herein refers to alignment along the longitudinal axis 37 and the term "lateral" refers to alignment in a direction generally perpendicular to the longitudinal axis 37.

The connectors 150 and 140 are generally shown to serve as terminations to the spoke 100 and provide means to connect or anchor the spoke 100 to a bracing element (i.e. rim 120 and/or hub shell 131). Note that the span of spoke 100 is aligned in the direction of spoke tension 30 and along the tensile axis 36, which extends through the longitudinal axis 37 of the spoke 100. It is shown here that several spokes 100 of the wheel 110 may be terminated in this manner. For simplicity in describing many of these embodiments, a rim connection arrangement is described, with the understanding that such an embodiment may be easily adapted to hub connections as well. It is understood that FIG. 4 corresponds to a simplified arrangement for illustration purposes. Several of the embodiments of the present invention may be applied to this arrangement, as well as arrangements which include facility for creating and/or adjusting spoke pre-tension.

The present invention comprises a spoke 100, which may be considered as a longitudinal tensile element having an end portion and a cross-section thereof, a connecting element (150, 140), a bracing element (120, 131), and a tensile axis 36 of applied tensile load 30 along the longitudinal tensile element. The spoke 100 is connected to the connecting element (150, 140) by means of an overlie connection between the spoke 100 or an intermediate element connected (i.e. nipple 190) to the spoke 100 and to the connecting element (150, 140). In the embodiments shown herein, the longitudinal tensile element is a vehicle wheel spoke 100, the hub shell 131 or hub flange constitutes a first bracing element and the outer rim 120 constitutes a second bracing element.

As described herein, a spoke is a generally long slender longitudinal tensile element, with a length greater than its cross sectional thickness, and with a longitudinal axis extending generally along its length. The spoke includes external sidewall surface(s) that extend generally along its length. As such, the longitudinal axis is generally parallel to the sidewall surface. The tensile axis is the axis along which tensile loads are applied to the tensile element, and is commonly collinear with the longitudinal axis, particularly in the region of the structural span of the longitudinal tensile element. For the purposes of explanation herein, the term "longitudinal axis" is generally interchangeable with the term "tensile axis", unless otherwise noted. Some examples of a longitudinal tensile element include the spoke of a vehicle wheel, a guy wire, a control cable, or a tendon. In most of the embodiments of the present invention, the longitudinal tensile element is capable of supporting tension, otherwise known as positive tensile loading, along its length. However, the tensile element may alternatively support compression, otherwise known as negative tensile loading, along its length, where the longitudinal tensile element provides columnar support between two bracing elements. The spoke span is considered as the portion of the spoke that is under tension and that extends between its anchor points and/or engagements at the bracing elements (i.e. hub and rim). A location outboard of the spoke span is a location along the tensile axis that is beyond or external to the spoke span. Further, a longitudinally outward orientation refers to an orientation along the longitudinal axis that is distal from the midpoint of the span. Conversely, a longitudinally inward orientation is refers to an orientation along the longitudinal axis that is proximal to the midpoint of the span. In reference to the spoke, a lateral orientation or direction is an orientation or direction that is generally perpendicular to the longitudinal axis, with a laterally inward orientation proximal to the longitudinal axis and a laterally outward orientation distal to the longitudinal axis.

It may be termed that a longitudinal engagement is an engagement that includes a continuous longitudinal engagement interface or an engagement that includes at least two engagement interface locations that are longitudinally spaced along the longitudinal axis of the spoke. It is generally desirable that the longitudinal length of such an engagement be greater than the cross-sectional thickness of the spoke to create an effective engagement. Obviously, increasing the length of engagement will increase the interface surface area and will therefore increase the load carrying capacity of the joinder between the connector and the spoke. A threaded engagement is usually considered to be a longitudinal engagement.

As described herein, a bracing element is one that resists or braces against all or part of the load of a tensile element. In other words, in order for a tensile element to maintain its tension (or compression) and remain a generally static structure, it must have a resisting or bracing element to bear against. Thus, the tensile element is generally anchored to two bracing elements and the tensile element thereby serves to connect the two bracing elements to each other. In an example where the tensile element is generally held in tension, such as the spoke of a tension-spoke vehicle wheel, a first bracing element could be the hub flange and a second bracing element could be the outer rim hoop. Similarly, in the case where the tensile element is generally held in compression, such as the spoke of a compression-spoke vehicle wheel, the bracing element is that element which the tensile element is pushed against.

FIGS. 5*a-i* describe an embodiment illustrating a blind connection between the spoke 100 and the spoke bed 70, showing the spoke bed 70, connector 150, nipple 190 and spoke 100. Spoke bed 70 includes a longitudinally outward surface 71, a longitudinally inward surface 72 and a hole 73 therethrough with hole sidewall 74, a hole entrance at an inward edge 78, an outward edge 77, and a circular diameter 75. Inward surface 72 and inward edge 78 are generally proximal the longitudinal midpoint of the span of the spoke 100, while outward surface 71 and outward edge 77 are generally opposed to the inward surface 72 and correspondingly distal from the longitudinal midpoint of the span of the spoke 100. Hole 73 extends along central axis 76, which is shown here to be generally radial in direction. Inward edge 78 is adjacent inward surface 72 and defines the perimeter of the entrance to the hole 70 through which the connector 150 is assembled. Spoke bed 70 is shown in fragmentary view for illustration purposes and it is understood that spoke bed 70 is representative to constitute a portion of a bracing element (i.e. the rim or hub flange) to which the connector 150 is connected. In the case shown here, the spoke bed 70 may be more closely representative of a spoke bed of a double wall rim such as the rim 120 of FIG. 4.

Nipple 190 is shown to be generally conventional in overall configuration and may be similar to that currently used in industry. Nipple 190 includes a shank portion 192, an enlarged head portion 193 and a generally laterally projecting transition surface 191 therebetween. Shank portion 192 is generally cylindrical about a central axis 196 and includes flats 195 such that nipple 190 may be manually manipulated with a wrench (not shown). Transition surface 191 is shown here to be a generally circular surface that is conical about the central axis 196, such that the transition surface 191 can accommodate the tilt angle 188 (as shown in FIG. 5*o*) while still maintaining a generally collinear surface contact with the outward surface 71. Head portion 193 also includes a circular cylindrical outer surface 194 of diameter 199 that is generally concentric with the corresponding diameter of the shank portion 192. Diameter 199 is preferably sized to be close to the diameter 75 of the hole 73, with the requisite clearance so that outer surface 194 may be assembled through hole 73 as shown in FIG. 5*d*. Nipple 190 also includes longitudinal hole 197 therethrough with internal threads 198 to threadably mate with external threads 105 of spoke 100. The nipple 190 may be made from a variety of materials known in industry, including conventional metallic nipple materials such as aluminum, brass, titanium or steel or alternative materials such as reinforced polymer. Further, the nipple 190 may be monolithic as is common in industry or it may be a joined assembly of multiple components and/or portions.

Figure 5B:
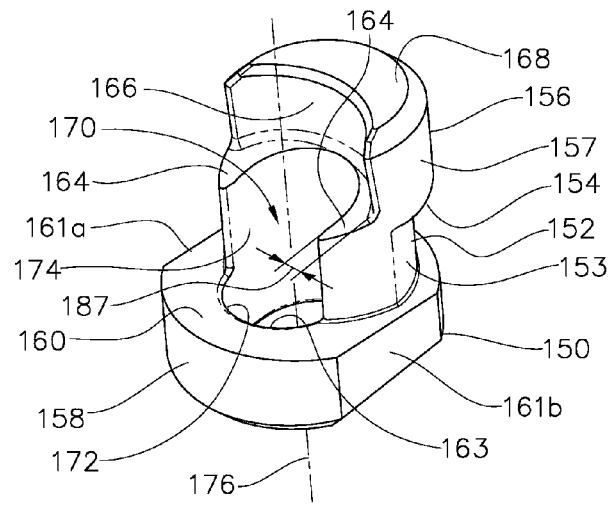

Connector 150 is particularly detailed in FIG. 5b and generally includes an offset portion 156, a cylindrical portion 152 and a flange 158. Offset portion 156 includes a concave locating surface 166, an outer surface 157, an overhang 154 surface and a top face 168. Cylindrical portion 152 includes cylindrical surface 153 that extends generally along cylindrical axis 176. Overhang 154 projects generally laterally outwardly from the cylindrical surface 153. Flange 158 is shown to be laterally enlarged in comparison with the cylindrical portion 152 and includes retaining face 160 and optional flats 161a and 161b to facilitate manual manipulation with a wrench (not shown). Opening 170 extends through the connector 150 generally along the cylindrical axis 176 as shown and includes an open portion 174 (in the general region of the cylindrical portion 152) and an enclosed portion 172 (in the general region of the flange 158). Flange 158 also includes bridge surface 163 that serves to enclose the enclosed portion 172 of opening 170. Engagement surface 164 is pierced by open portion 174 of opening 170 and extends in a general yoke or U-shape as shown. The connector 150 may be made from a variety of materials well known in industry, including metallic materials such as aluminum, magnesium, zinc, brass, titanium or steel and also including reinforced polymeric materials such as fiber reinforced thermoplastic or thermoset resin. Further, the connector 150 may be monolithic (as shown) or it may be a joined assembly of multiple components and/or portions.

Spoke 100 includes a shank portion 101 that extends longitudinally along longitudinal axis 37 with a second end 107 portion that includes external threads 105. Although not shown in FIGS. 5a-p, the spoke 100 may also include a first end 106 portion with a head 102 as shown in FIG. 4 for connection with a bracing element opposed to spoke bed 70. In such a case, spoke 100 would be generally conventional in overall configuration and may be similar to "straight pull" spokes currently used in industry. The spoke 100 may be made from a variety of materials well known in industry, including conventional spoke materials such as aluminum, titanium or stainless steel. Further, the spoke 100 may be monolithic as is common in industry or it may be a joined assembly of multiple components and/or portions.

The spoke 100 is shown in the assembly sequences of FIGS. 5c-h to be threadably pre-assembled to the nipple 190, with external threads 105 threadably mated and engaged to internal threads 198. This preassembly provides the added convenience of allowing the spoke 100 to be utilized as a handle to aid in manipulating the nipple 190 and connector 150 during these assembly sequences. Alternatively, the spoke 100 may remain separate and unassembled from the nipple 190 until an assembly sequence subsequent to that shown in FIG. 5c or subsequent to that shown in FIG. 5h. As a further alternative, a dummy spoke (not shown) may be preassembled to the nipple during these some or all of these assembly sequences, with the actual spoke 100 being substituted for the dummy spoke at a later assembly sequence.

Figure 5A:
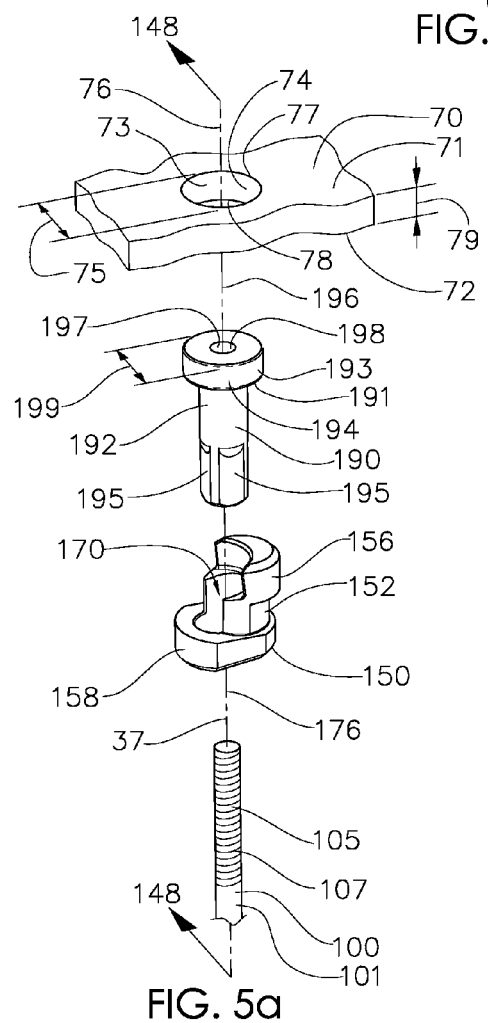
FIG. 5a is a partial exploded perspective view of a first embodiment of the present invention, describing a blind connection between the spoke and the spoke bed, including a connector and spoke nipple.
Figure 5C:
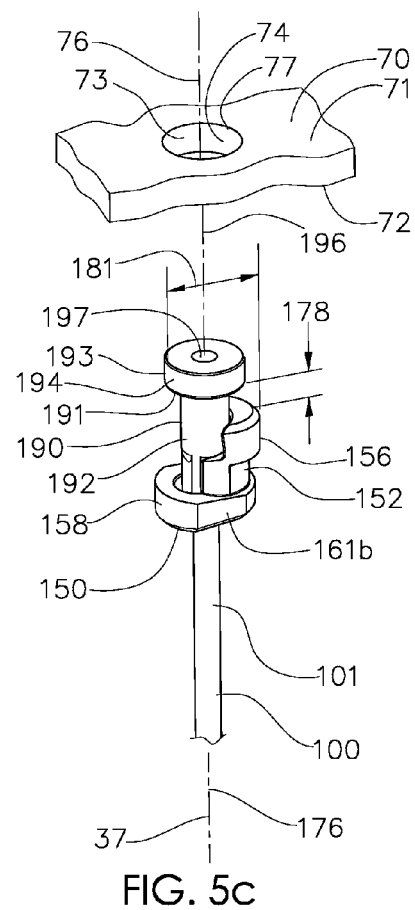
FIG. 5c is a partial exploded perspective view of the embodiment of FIG. 5a, describing a first assembly step between the spoke nipple, the connector and the spoke bed, with the spoke preassembled to the nipple and with the nipple located within the opening of the connector in an insertion orientation.

FIG. 5a shows the spoke bed 70, the nipple 190, the connector 150 and the spoke 100 in exploded view prior to the subsequent assembly steps as described herein. FIG. 5c shows a first assembly step where the nipple 190 is threadably pre-assembled to spoke 100 and the shank portion 192 of the nipple 190 is located within the opening 170 of the connector 150, with the head portion 193 positioned to provide a gap 178 between the transition surface 191 and the top face 168. This gap 178 is preferably greater than or equal to the spoke bed thickness 79. The nipple 190 is positioned such that the shank portion 192 is deeply laterally nested within opening 170 such that width 181 between outer surface 157 and outer surface 194 is minimized to achieve an insertion orientation for insertion through hole 73. Next, the spoke 100, nipple 190 and connector 150 are assembled through the spoke bed 70 in direction 180 as shown in FIG. 5d such that head portion 193 is passed through hole 73 and advanced in direction 180 such that transition surface 191 is beyond outward surface 71. It is preferable that diameter 199 is sized to provide assembly clearance with diameter 75 to facilitate this passage.

Figures 5G, 5H:
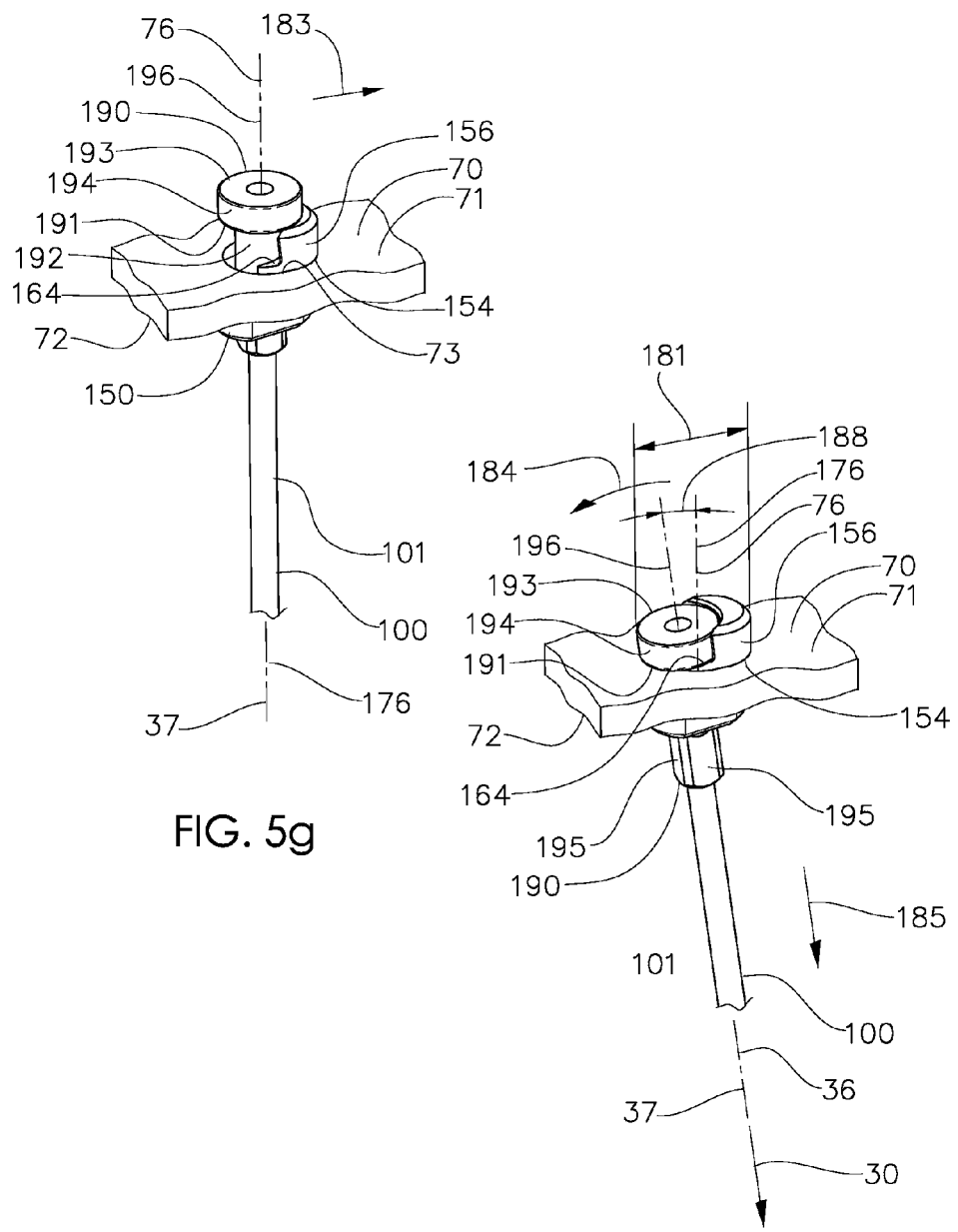
FIG. 5g is a partial exploded perspective view of the embodiment of FIG. 5a, describing a fifth assembly step, with the overhang surface advanced beyond the spoke bed and the connector shifted laterally relative to the hole.
FIG. 5h is a partial exploded perspective view of the embodiment of FIG. 5a, describing a sixth assembly step, with the nipple shifted laterally, and then longitudinally inwardly, relative to the connector to achieve an engagement orientation therebetween and with the transition surface of the nipple overlying and abutting both the engagement surface of the connector and the outward surface of the spoke bed.

With the transition surface 191 advanced beyond outward surface 71, the spoke 100, nipple 190, and connector 150 may next be shifted laterally in direction 182 as shown in FIG. 5e. As defined herein, a lateral direction or orientation is a direction or orientation that is generally perpendicular to the longitudinal axis 37. This lateral shift positions the connector 150 in an insertion orientation relative to the spoke bed 70 and allows the outer surface 157 (shown here to be a straight circular cylindrical surface) of the connector 150 to become aligned and generally concentric with the hole 73. With the outer surface 157 now aligned with the hole 73, the spoke 100, nipple 190, and connector 150 may next be advanced further in direction 180 such that offset portion 156 of connector 150 is passed further through hole 73 as shown in FIG. 5f. The connector 150 is then further advanced in direction 180 until the retaining face 160 of the flange 158 abuts the inward surface 72 and the overhang 154 just clears past the outward surface 71. Next, with the overhang 154 now positioned to be longitudinally outward and clear of the outward surface 71, the connector 150 may be shifted laterally in direction 183 until the cylindrical surface 153 is nested, contacting, and abutting the sidewall 74 of the hole 73 as shown in FIG. 5g. The connector 150 has thus been laterally shifted relative to the spoke bed 70 into an engagement orientation or position, with the overhang 154 laterally overlying the outward surface 71 by lateral overlap 186. It is noted that the retaining face 160 preferably extends outside and laterally outward of the inward edge 78 of hole 73 to abut the inward surface 72 and provide a limit stop to prevent the connector 150 from advancing too far in direction 180. The connector 150 is now engaged and locked to the spoke bed 70 along direction 180, with overhang 154 engaged to outward surface 71 and with retaining face 160 engaged to inward surface 72.

Next, as shown in FIG. 5h, the pre-assembled spoke 100 and nipple 190 is first tilted and laterally shifted in direction 184 and positioned at tilt angle 188 relative to the cylindrical axis 176 and hole axis 76 such that the outer surface 194 of the nipple 190 is laterally shifted and aligned with the locating surface 166 of the connector 150. The nipple 190 is then withdrawn in direction 185 such that the transition surface 191 contacts both the engagement surface 164 and the outward surface 71. There is now a lateral overlap 187 (shown in FIG. 5o) or overlie between a first region of the transition surface 191 and the outward surface 71 and a lateral overlap 189 or overlie between a second region of the transition surface 191 and the engagement surface 164, with the first region generally opposed to the second region about the longitudinal axis 37. It is noted that the opening 170 provides clearance for the nipple 190 to shift and/or tilt laterally relative to the connector 150, including tilt angle 188. With the transition surface 191 now overlying and bearing against the engagement surface 164, the outer surface 194 of the nipple 190 is also engaged and bearing against the locating surface 166 of the connector 150. This bearing engagement serves to maintain the tilted and lateral spread width 181 between outer surfaces 194 and 157, with the nipple 190 and connector 150 now in an engagement orientation as also illustrated in FIG. 5o. This spread engagement orientation serves to maintain the lateral overlap 186 and overlie engagement between the connector 150 and the spoke bed 70 as well as the overlying lateral overlap 187 and overlie engagement between the nipple 190 and the spoke bed 70. Thus, simultaneous with a portion of the transition surface 191 contacting and bearing against the engagement surface 164, another portion of the transition surface 191 is also contacting and bearing against the outward surface 71 of the spoke bed 70. While it is shown in FIGS. 5h and 5o that the nipple 190 is laterally shifted by tilting through tilt angle 188, it is also understood that this the nipple may alternatively be laterally shifted without a tilt angle 188.

Thus the spoke 100 is connected and engaged with the nipple 190, which is connected and engaged to the connector 150, which is connected and engaged to the spoke bed 70. It should be noted that the nipple 190 serves as an intermediate connecting element between the spoke 100 and the connector 150. These connections effectively join the spoke 100 to the spoke bed 70 to provide a firm connection therebetween to resist spoke tension 30. Thus, a blind connection between the spoke 100 and the spoke bed 70 is achieved. This assembly of the spoke 100, nipple 190, connector 150 and spoke bed 70 may also be disassembled in the reverse of the sequence described in FIGS. 5a-h. It may be seen that the present invention provides particular advantage in the spoke bed of a tubeless tire rim application, since the sealed tire bed (not shown) is not required to be pierced and may now be used as a sealing air barrier.

It is noted that the outward surface 71 may be representative of an interior surface or a surface of the spoke bed that may be hidden or obscured or a surface to which there is limited or no access. The inward surface 72 is representative of the exterior surface of the spoke bed 70 to which there is access. As such, the blind connection provided by the present invention is particularly advantageous since the connection between the spoke and the spoke bed is achieved by means of assembly and manipulation only through the accessible exterior of the bracing element and does not require access to the inaccessible interior of the bracing element. Further, it is noted that the inward surface 72 is also the surface that faces the span portion of the spoke 100 that extends between the hub and rim. As defined herein, and also in industry, a blind assembly is one that has been achieved by installation with access to only one side of a base part, in this case the blind assembly has required access only to the inward surface 72 of the spoke bed 70.

It is noted that the circular cylindrical outer surface 194 is concentric with the circular cylindrical shank portion 192 about the central axis 196 and the outer surface 194 is also matched to the concave locating surface 166. This allows the nipple 190 to rotate about central axis 196 relative to the connector 150. Thus, the spoke tension 30 pre-load may be adjusted in the conventional manner as previously described by threadably adjusting the internal threads 198 of the nipple 190 relative to the external threads 105 of the spoke 100 by means of a wrench (not shown) engaged to flats 195. Further, the connector 150 may be prevented from inadvertently rotating during this adjustment by means of a wrench (not shown) engaged with flats 161a and 161b. Additionally, the connector 150 may be selectively rotated about the central axis 76 with a wrench (not shown) engaged to flats 161a and 161b for proper positional alignment of the connector 150, nipple 190, and spoke 100 and to direct the tilt angle 188 in the desired orientation. Finally, the spoke 100 is now engaged and locked to the spoke bed 70 to support spoke tension 30 loads along the tensile axis 36.

Figure 5I:
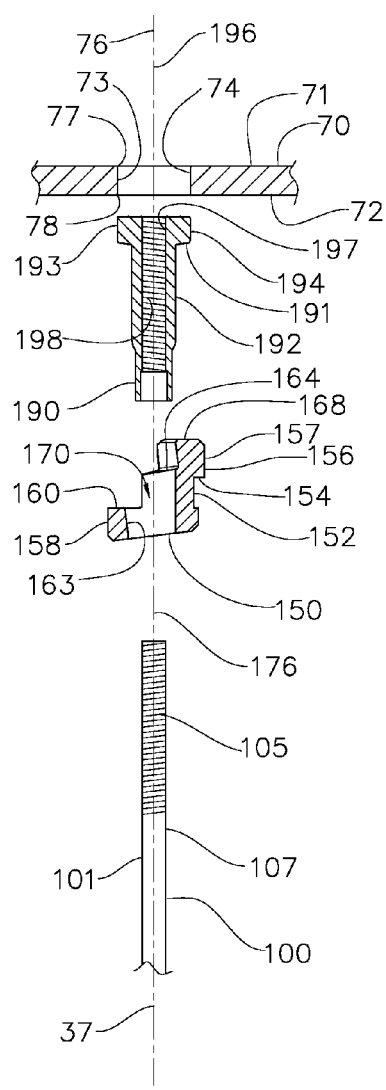
Figure 5J:
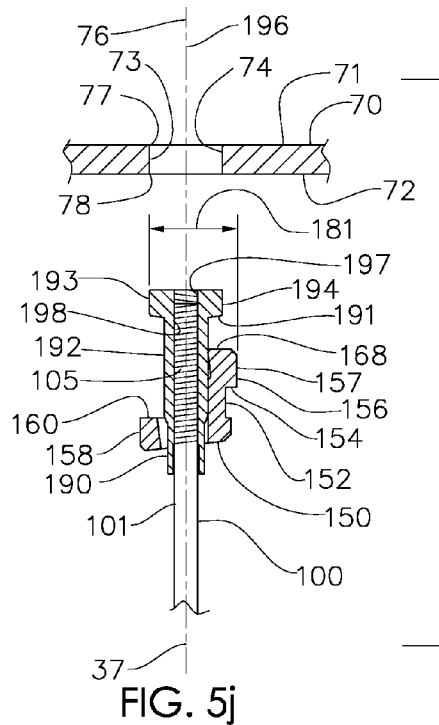
FIG. 5j is an exploded cross section view, taken along 148-148, of the embodiment of FIG. 5a and corresponding to FIG. 5c.
Figure 5K:
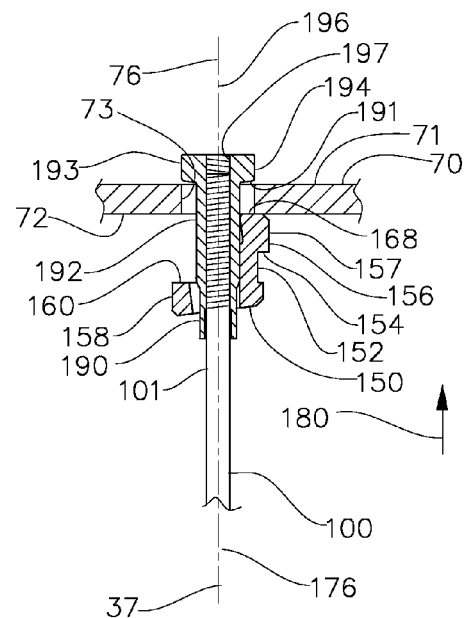
FIG. 5k is an exploded cross section view, taken along 148-148, of the embodiment of FIG. 5a and corresponding to FIG. 5d.
Figure 5L:
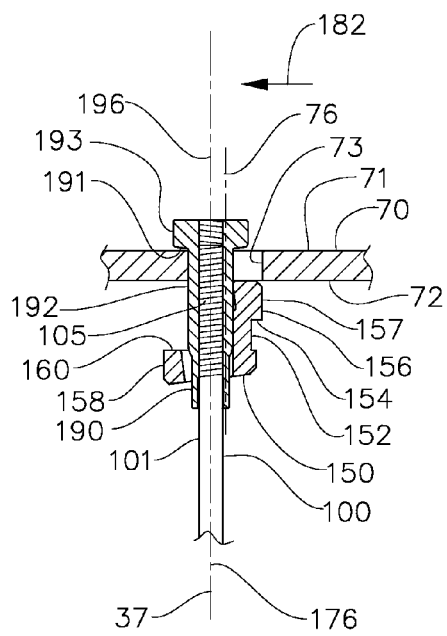
FIG. 5L is an exploded cross section view, taken along 148-148, of the embodiment of FIG. 5a and corresponding to FIG. 5e.
Figure 5M:
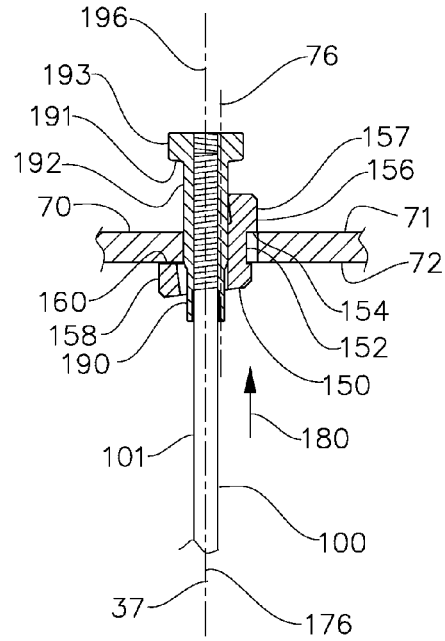
FIG. 5m is an exploded cross section view, taken along 148-148, of the embodiment of FIG. 5a and corresponding generally to FIG. 5f.
Figure 5N:
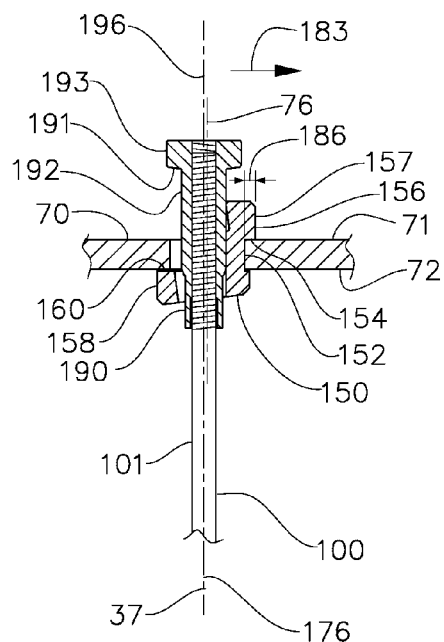
FIG. 5n is an exploded cross section view, taken along 148-148, of the embodiment of FIG. 5a and corresponding to FIG. 5g.
Figure 5O:
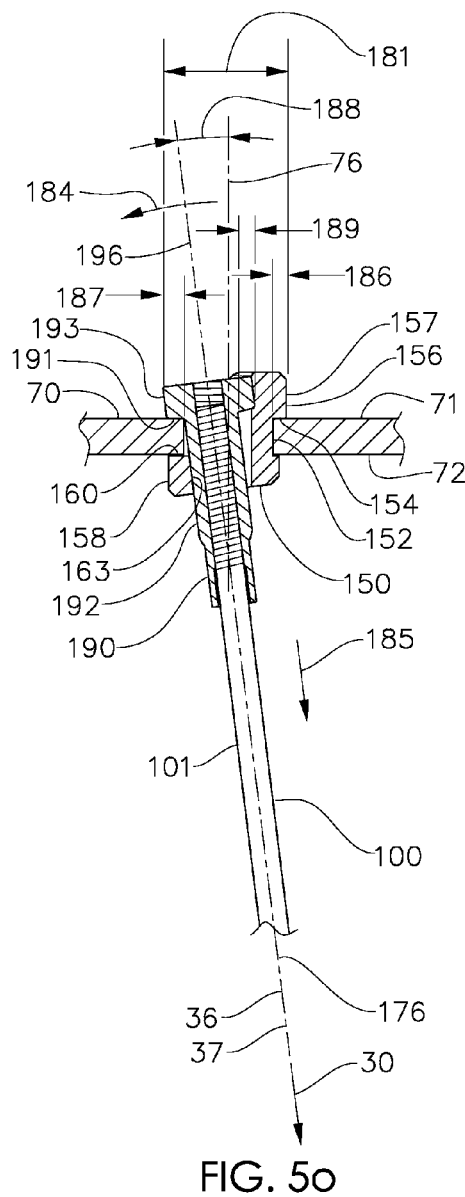
FIG. 5o is a cross section view, taken along 148-148, of the embodiment of FIG. 5a and corresponding to FIG. 5h.

FIGS. 5i-o are shown in cross section and describe the sequence of FIGS. 5a-h in greater detail. FIG. 5i corresponds to FIG. 5a and shows the spoke 100, nipple 190, connector 150 and spoke bed 70 in exploded view. FIG. 5j corresponds to the assembly sequence of FIG. 5c and shows the spoke 100 threadably preassembled to the nipple 190, with the nipple 190 aligned with the hole 73. FIG. 5k corresponds to the assembly sequence of FIG. 5d and shows the spoke 100, nipple 190, connector 150 advanced in direction 180 relative to the spoke bed 70 such that the head portion 193 is passed longitudinally outwardly through the hole 73. FIG. 5L corresponds to the assembly sequence of FIG. 5e and shows the spoke 100, nipple 190 and connector 150 laterally shifted in direction 182 relative to the spoke bed 70. FIG. 5m corresponds to the completed assembly sequence of FIG. 5f and shows the spoke 100, nipple 190 and connector 150 further advanced in direction 180 such that the overhang 154 and retaining face 160 are aligned with the outward surface 71 and inward surface 72 respectively. FIG. 5n corresponds to the assembly sequence of FIG. 5g and shows the spoke 100, nipple 190 and connector 150 shifted laterally in direction 183 such that the connector 150 is engaged to the spoke bed 70 with overhang 154 and retaining face 160 overlying and engaged with the outward surface 71 and inward surface 72 respectively. FIG. 5o corresponds to the assembly sequence of FIG. 5h and shows the nipple 190 tilted in direction 184 and withdrawn in direction 185 such that the outer surface 194 is overlapping the locating surface 166 along the longitudinal axis 37 and the transition surface 191 overlies the outward surface 71 by overlap 187 for an overlie engagement therebetween to resist spoke tension 30. Simultaneously, the transition surface 191 overlies the engagement surface 164 by overlap 189 for an overlie engagement therebetween to resist spoke tension 30.

The connector 150 is generally shown to serve as a termination to the spoke 100 and provide means to connect or anchor the spoke 100 to a bracing element (i.e. rim and/or hub shell). Note that the span of spoke 100 is aligned in the direction of spoke tension 30 and along the tensile axis 36, which extends through the longitudinal axis 37 of the spoke 100. It is understood that several spokes 100 of the wheel may be terminated in this manner. For simplicity in describing many of these embodiments, a rim connection arrangement is described, with the understanding that such an embodiment may be easily adapted to hub connections as well.

It is noted that the connector 150 serves several functions in its role as creating an anchoring means between the spoke 100 and the spoke bed 70. Some of these functions include: (i) the overlapping and nesting between the outer surface 194 and the locating surface 166 serves to lock and maintain the laterally spread orientation between the nipple 190 and the connector 150 and to maintain the lateral overlaps 187 and 186 and corresponding overlie engagements between the nipple 190 and the spoke bed 70 and between the connector 150 and the spoke bed 70; (ii) the flange of the connector serves to provide accurate locating between the overhang 154 and the outward surface 71; (iii) the lateral overlap 186 serves to provide an overlie engagement between the connector and the spoke bed and (iii) the longitudinal overlapping and nesting between the outer surface 194 and the locating surface 166 serves to counter the tendency of the connector 150 to tilt due to the lateral offset between the tensile axis 36 (spoke tension 30 load) and the overlie engagement between the overhang 154 and the spoke bed 70; (iv) the bearing engagement between the bridge surface 163 and the shank portion 192 also serves to counter the tendency of the connector 150 to tilt due to the lateral offset between the tensile axis 36 (spoke tension 30 load) and the overlie engagement between the overhang 154 and the spoke bed 70; (v) the lateral overlap 189 and overlie engagement between the transition surface 191 and the engagement surface 164 serves to provide blocking resistance to spoke tension 30 loads; (vi) the lateral overlap 187 and overlie engagement between the transition surface 191 and the outward surface 71 also serves to provide blocking resistance to spoke tension 30 loads.

Figure 5P:
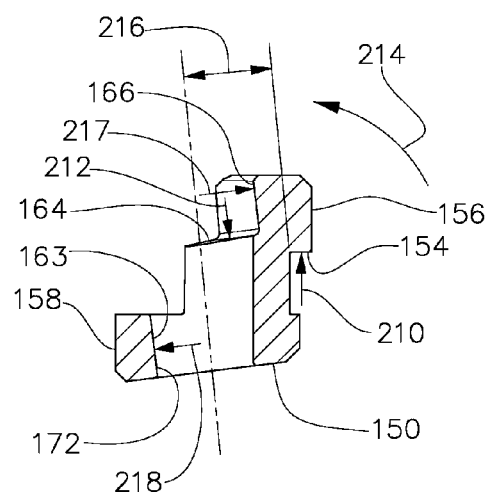
FIG. 5p is a cross section view, taken along 148-148, of the connector of FIG. 5a, detailing the primary interface bearing loads between the connector and the nipple and between the connector and the spoke bed.

FIG. 5p describes some of the more significant loads that are applied to the connector 150 as described in FIG. 5o, as well as the reaction to these loads. Firstly, the spoke tension 30 load induces the transition surface 191 to bear against the engagement surface 164 with bearing load 212. The connector 150 is supported against this tension load 212 with overhang 154 bearing against the outward surface 71, thus resulting in support load 210 applied to the connector 150. The bearing load 212 is laterally offset from the support load 210 by distance 216. This lateral offset serves to apply a tilting moment to the connector 150 in direction 214 about the interface between the overhang 154 and the outward surface 71. This tilting moment is resisted by the interaction between the outer surface 194 and the locating surface 166, which results in locating reaction 217 applied to the connector 150. Additionally, this rotational torque is also resisted by the interaction between the shank portion 192 and the bridge surface 163, which results in bridge reaction 218 applied to the connector 150. It is noted that locating reaction 217 and bridge reaction 218 are redundant reaction forces to resist the rotational torque and as such, it may be possible to eliminate one or the other reaction force from the design. For example, the flange may alternatively be eliminated, which therefore would eliminate the bridge surface 163 and the rotational torque would be resisted only by the locating reaction 217. As a further alternative, the connector 150 may be designed such that the locating surface 166 may not contact the outer surface 194 and the rotational torque would be resisted only by the bridge reaction 218.

Figure 6:
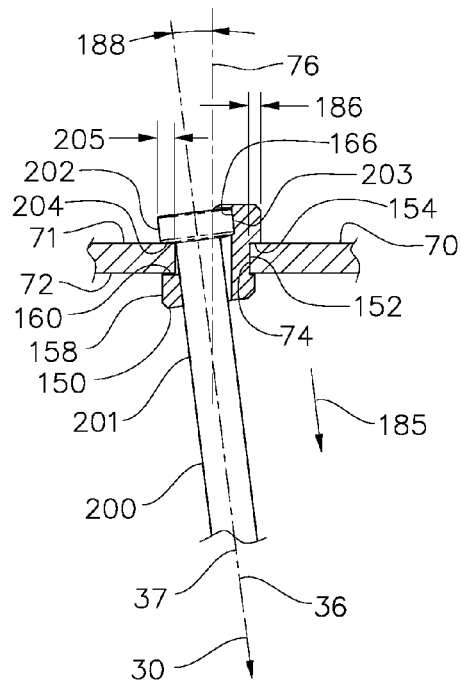
FIG. 6 is a cross section view of a second embodiment of the present invention, corresponding to FIG. 5o, showing a headed spoke in substitution for the combined spoke and nipple of FIGS. 5a-p.

FIG. 6 describes an alternate embodiment similar to the embodiment of FIGS. 5a-p and is shown in a view corresponding to FIG. 5o. Spoke bed 70 and connector 150 are identical to that described in FIGS. 5a-p. Spoke 200 includes a shank portion 201 that extends longitudinally along longitudinal axis 37 with a second end 207 that includes a head portion 202, a cylindrical outer surface 203 and transition surface 204 as shown. In this embodiment, spoke 200 may be considered to be generally conventional in overall configuration and is similar to a "straight pull" spoke. The head portion 202, outer surface 203, shank portion 201, and transition surface 204 of the spoke 200 have identical function to the respective head portion 193, outer surface 204, shank portion 192, and transition surface 191 of the nipple 190 shown in FIGS. 4a-p. In contrast to the embodiment of FIGS. 5a-p, which utilizes the nipple 190 as an intermediate connecting element connected to the spoke 100, FIG. 6 shows the transition surface 204 as formed directly in the spoke itself. The spoke 200 may be made from a variety of materials well known in industry, including conventional spoke materials such as aluminum, titanium or stainless steel or less conventional materials such as fiber reinforced polymer. Further, the spoke 200 may be monolithic as is common in industry or it may be a joined assembly of multiple components and/or portions.

Spoke 200 and connector 150 are assembled to spoke bed 70 in a manner similar to that described in FIGS. 5a-p. Spoke 200 represents the monolithic combination of nipple 190 and spoke 100 of the embodiment of FIGS. 5a-p. It is noted that the opening 170 provides clearance for the spoke 200 to shift and/or tilt laterally relative to the connector 150, including tilt angle 188. Spoke tension 30 presses the transition surface 204 to bear against the engagement surface 164, the outer surface 203 of the head 202 is now also engaged and bearing against the locating surface 166 of the connector 150. This bearing engagement serves to maintain the tilted and lateral spread positioning of the spoke 200 relative to the connector 150 as shown. This spread position serves to maintain the lateral overlap 186 and overlie engagement between the connector 150 and the spoke bed 70 as well as the overlying lateral overlap 205 and overlie engagement between the spoke 200 and the spoke bed 70. Thus, simultaneous with a portion of the transition surface 204 contacting and bearing against the engagement surface 164, another portion of the transition surface 204 is also contacting and bearing against the outward surface 71 of the spoke bed 70. This connection effectively joins the spoke 200 to the spoke bed 70 to support spoke tension 30. Thus, a blind connection between the spoke 200 and the spoke bed 70 is achieved.

Figure 7:
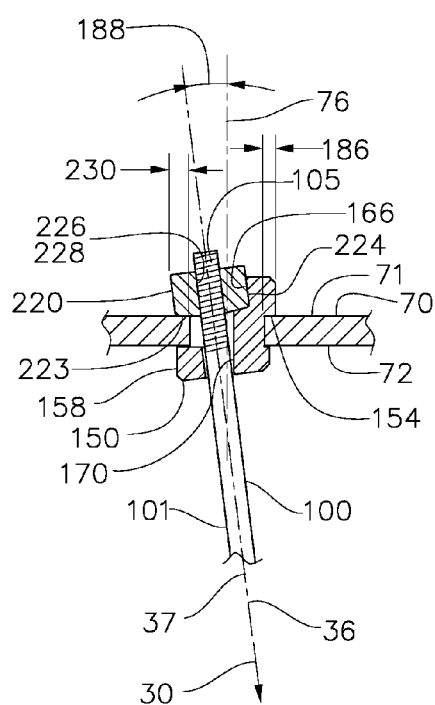
FIG. 7 is a cross section view of a third embodiment of the present invention, corresponding to FIG. 5o, showing a nipple lacking a shank portion that extends through the connector.

FIG. 7 describes a second alternate embodiment similar to the embodiment of FIGS. 5a-p and is shown in a view corresponding to FIG. 5o. Spoke bed 70 and spoke 100 are identical to that described in FIGS. 5a-p. Connector 150 has identical features to that described in FIGS. 5a-p, however some of the dimensions have been adjusted to mate with spoke 100 and nut 220. Nut 220 is similar to nipple 190 of FIGS. 5a-p, however nut 220 does not include a shank portion that extends through the hole 73 of the spoke bed 70 or the opening 170 of the connector 150. Nut 220 includes a transition surface 223 and an outer surface 224. Nut 220 also includes longitudinal hole 226 therethrough with internal threads 228 to threadably engage with external threads 105 of spoke 100.

Nut 220, spoke 100 and connector 150 are assembled to spoke bed 70 in a manner similar to that described in FIGS. 5a-p. It is noted that the opening 170 provides clearance for the spoke 100 to shift and/or tilt laterally relative to the connector 150, including tilt angle 188. Spoke tension 30 presses the transition surface 223 to bear against the engagement surface 164 and the outer surface 224 of the nut 220 is now also engaged and bearing against the locating surface 166 of the connector 150. This bearing engagement serves to maintain the tilted and lateral spread positioning of the spoke 100 and nut 220 relative to the connector 150 as shown. This spread position serves to maintain the lateral overlap 186 and overlie engagement between the connector 150 and the spoke bed 70 as well as the overlying lateral overlap 230 and overlie engagement between the nut 220 and the spoke bed 70. Thus, simultaneous with a portion of the transition surface 223 contacting and bearing against the engagement surface 164, another portion of the transition surface 223 is also contacting and bearing against the outward surface 71 of the spoke bed 70. The function of nut 220 is similar to that of nipple 190 and includes a transition surface 223 and an outer surface 224, however it does not include the shank portion 192. Thus, nut 220 does not extend through the connector 150 and may not be easily manipulated on the external and exposed side of the assembly with the spoke bed 70. Outer surface 224 and transition surface 223 interacts with the connector 150 in a manner identical to outer surface 194 and transition surface 191 (respectively) as previously described in FIGS. 5a-p. The outer surface 224 may be a circular cylindrical surface or it may be a noncircular surface that may be rotationally keyed with the locating surface 166 about the longitudinal axis 37. This connection effectively joins the spoke 100 to the spoke bed 70 to support spoke tension 30. Thus, a blind connection between the spoke 100 and the spoke bed 70 is achieved.

Figure 8A:
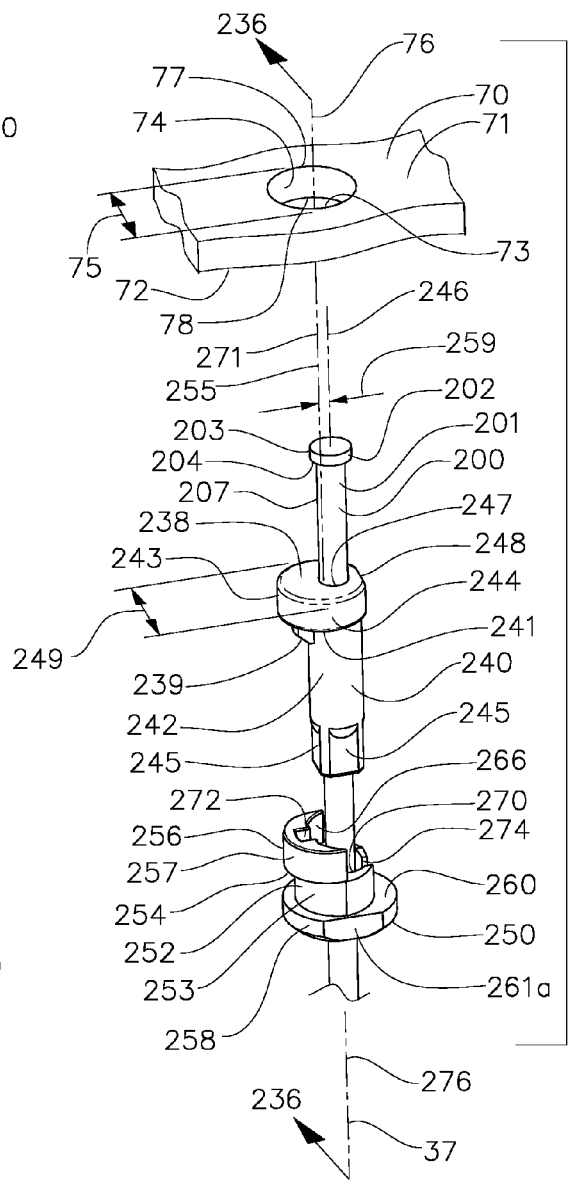
FIGS. 8a-p describe a fourth embodiment of the present invention, showing a nipple with a head portion eccentric with the shank portion and showing that the nipple may be rotated to create an overlie engagement with the spoke bed.
Figure 8B:
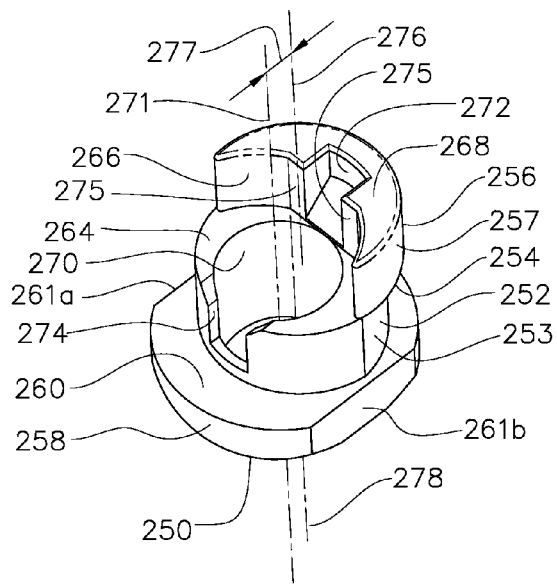
Figure 8C:
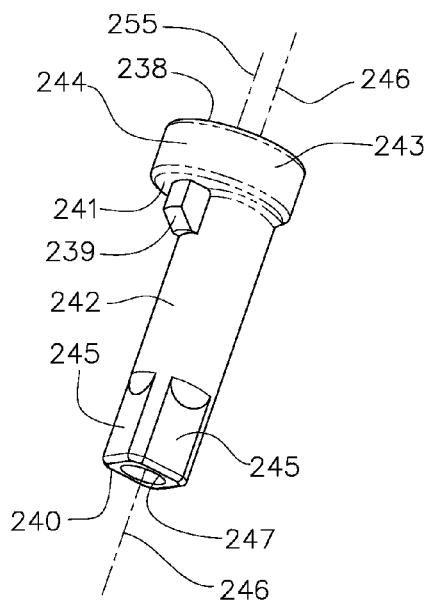
Figure 8D:
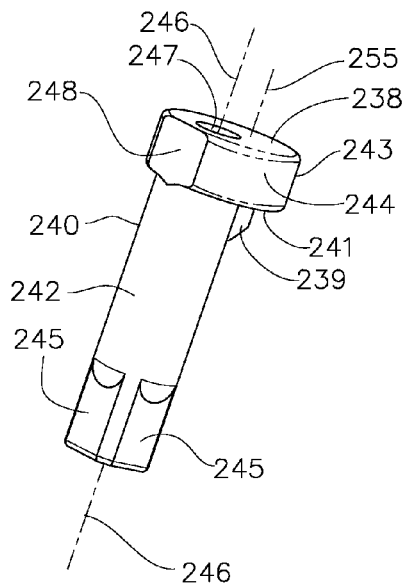
Figure 8E:
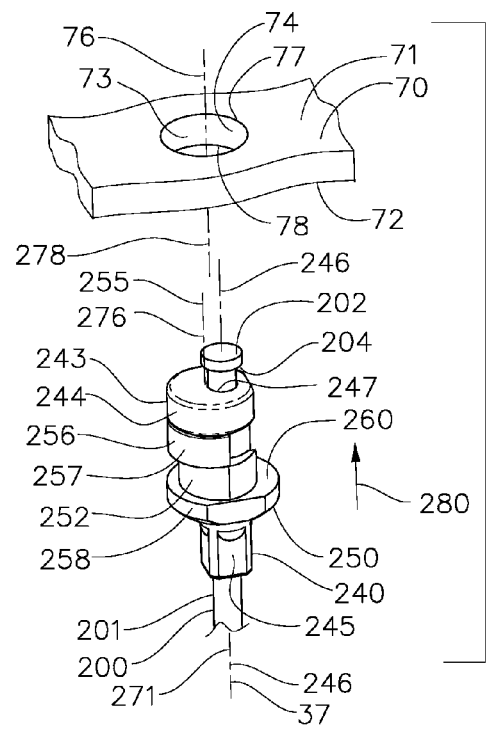
FIG. 8e is a partial exploded perspective view of the embodiment of FIG. 8a, describing a first assembly step between the spoke, nipple, connector and the spoke bed, with the spoke preassembled to the nipple in an insertion orientation and with the nipple located within the opening of the connector.
Figure 8F:
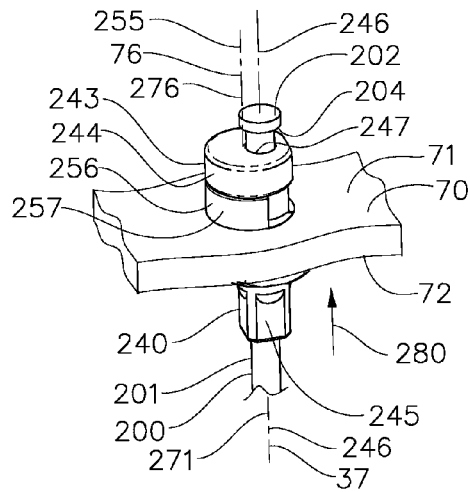
FIG. 8f is a partial perspective view of the embodiment of FIG. 8a, describing a second assembly step between the connector and the spoke bed, with the head of the nipple and the offset portion of the connector inserted through the hole of the spoke bed.
Figure 8G:
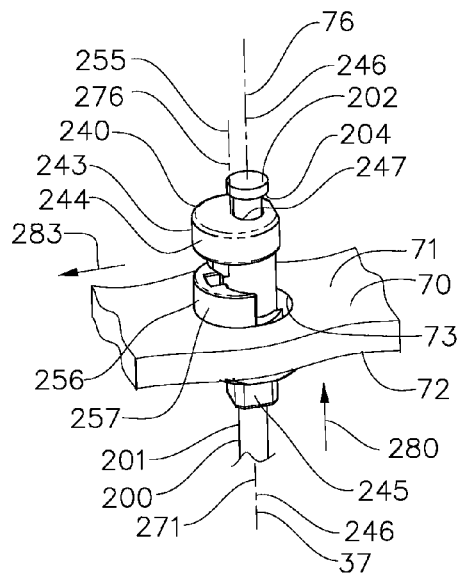
FIG. 8g is a partial perspective view of the embodiment of FIG. 8a, describing a third assembly step, with the connector and nipple shifted laterally relative to the hole such that the connector overlies and engages the spoke bed, with the nipple also displaced longitudinally outwardly relative to the connector.
Figure 8H:
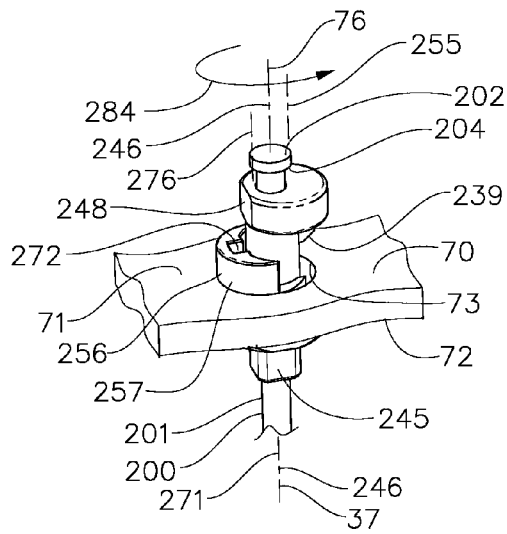
FIG. 8h is a partial perspective view of the embodiment of FIG. 8a, describing a fourth assembly step, with the nipple rotated about the longitudinal axis such that the transition portion overhangs the spoke bed.
Figure 8I:
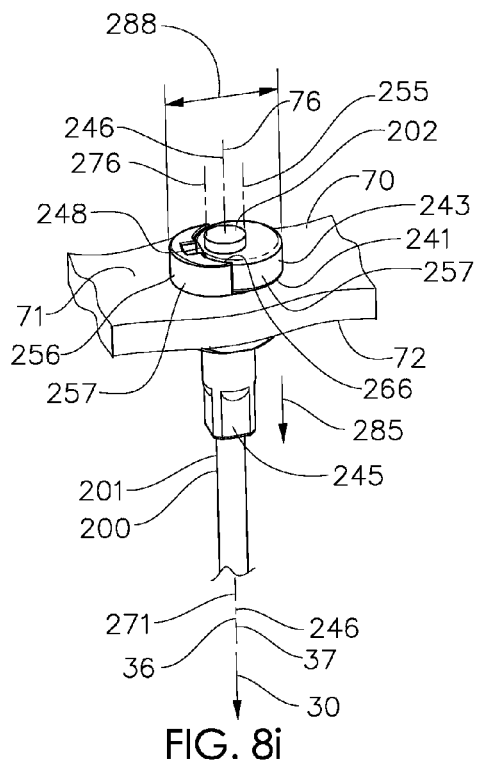
FIG. 8i is a partial perspective view of the embodiment of FIG. 8a, describing a fifth assembly step, with the nipple withdrawn longitudinally inwardly such that the transition surface overlies and contacts the outward surface of the spoke bed and with the nipple and connector in an engagement orientation relative to each other.
Figure 8J:
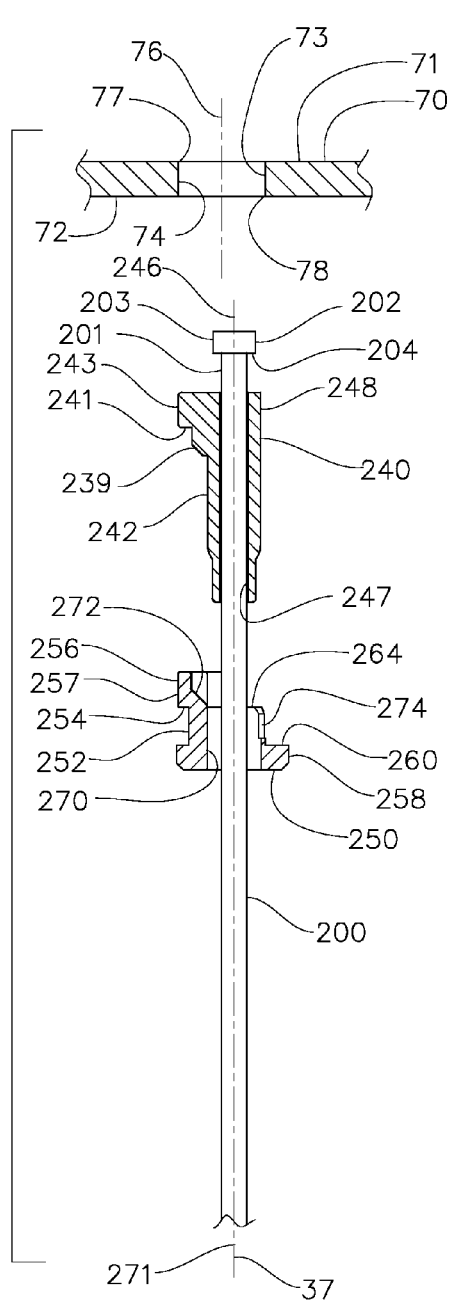
Figure 8K:
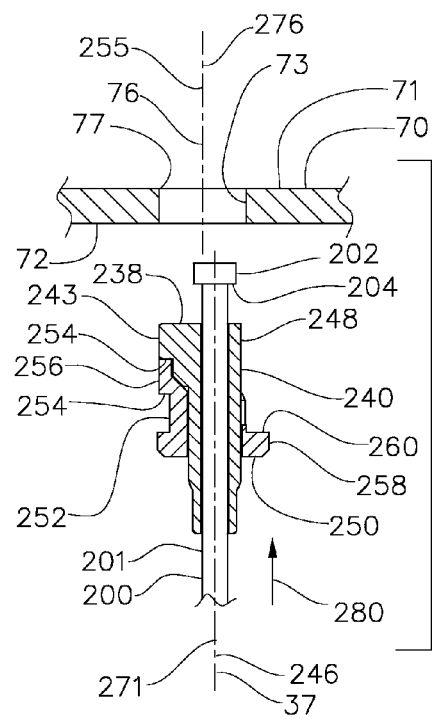
FIG. 8k is a cross section view, taken along 236-236, of the embodiment of FIG. 8a and corresponding to FIG. 8e.
Figure 8L:
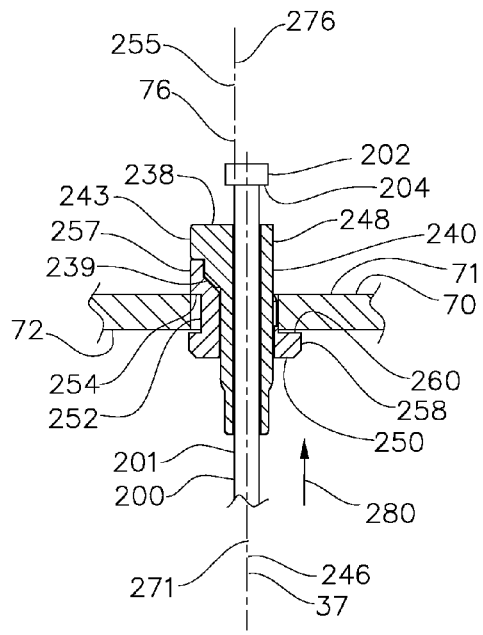
FIG. 8L is a cross section view, taken along 236-236, of the embodiment of FIG. 8a and corresponding to FIG. 8f.
Figure 8M:
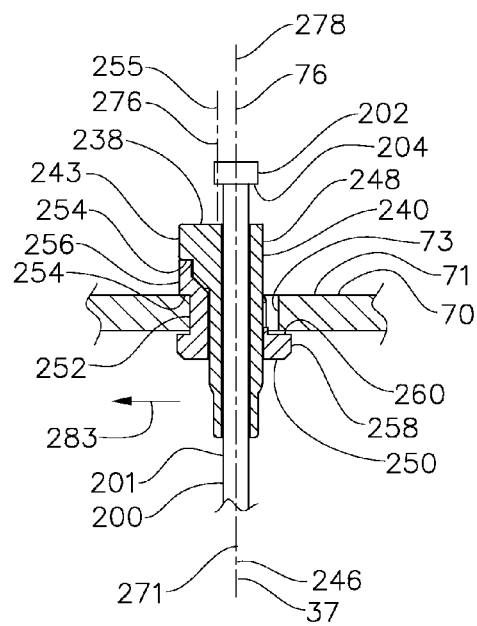
FIG. 8m is a cross section view, taken along 236-236, of the embodiment of FIG. 8a and corresponding to the transition between FIG. 8f and FIG. 8g.
Figure 8N:
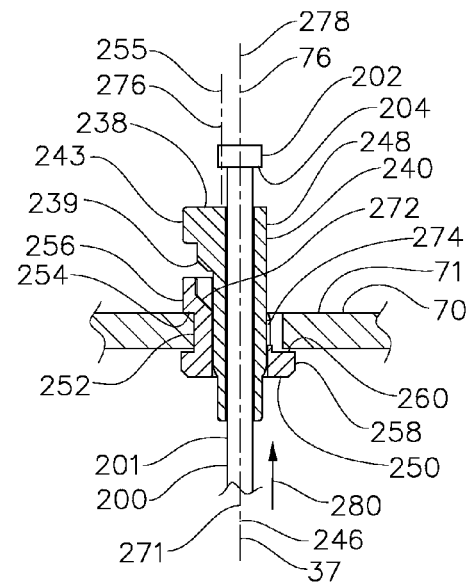
FIG. 8n is a cross section view, taken along 236-236, of the embodiment of FIG. 8a and corresponding to FIG. 8g.
Figure 8O:
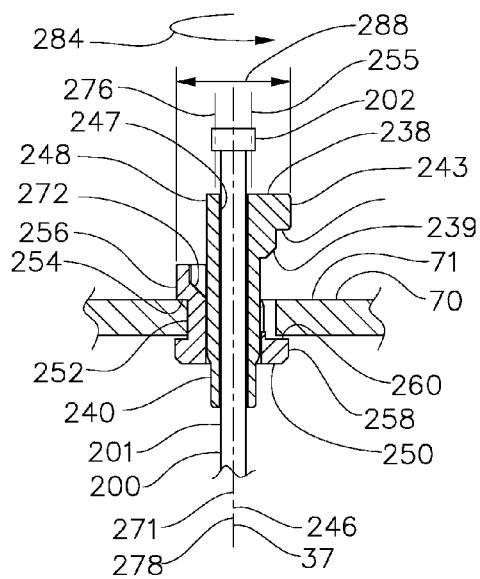
FIG. 8o is a cross section view, taken along 236-236, of the embodiment of FIG. 8a and corresponding to FIG. 8g.
Figure 8P:
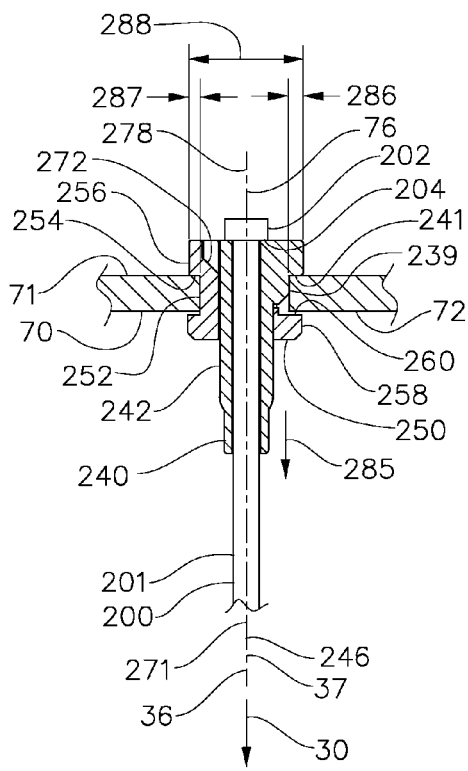

FIGS. 8a-p describe an embodiment similar to the embodiment of FIGS. 5a-p, however, instead of the nipple 190 tilting and laterally shifting into an overlie engagement between the transition surface 191 and the outward surface 71, FIGS. 8a-p show how a nipple 240 may instead be rotated about the central axis 246 of the shank portion 242 to align an eccentric head portion 243 into an overlie engagement with outward surface 71. FIGS. 8a-p illustrates a blind connection between the spoke 200 and the spoke bed 70, showing the spoke bed 70, connector 250, nipple 240 and spoke 200. Spoke bed 70 is identical to that described in FIGS. 5a-p and includes an outward surface 71, an inward surface 72 and a hole 73 therethrough with hole sidewall 74 and circular diameter 75. Hole 73 extends along central axis 76, which is shown here to be generally radial in direction. Spoke bed 70 is shown in fragmentary view for illustration purposes and it is understood that spoke bed 70 is representative to constitute a portion of a bracing element (i.e. the rim or hub flange) to which the connector 150 is connected.

Nipple 240 includes a shank portion 242, an enlarged head portion 243 and a transition surface 241 therebetween. Shank portion 242 is generally cylindrical about a central axis 246 and includes flats 245 such that nipple 240 may be manually manipulated with a wrench (not shown). Head portion 243 also includes a top face 238 and a circular cylindrical outer surface 244 of diameter 249 that is generally cylindrical about a head axis 255. Head axis 255 is offset and generally parallel relative to central axis 246 by eccentricity 259 such that outer surface 244 is eccentric relative to the corresponding diameter of the shank portion 242 as shown. Diameter 249 is preferably sized to be close to the diameter 75 of the hole 73, with the requisite clearance so that outer surface 244 may be assembled through hole 75 as shown in FIG. 8f. Nipple 240 also includes longitudinal hole 247 that is sized such that spoke 200 may be passed therethrough, and a projection or key 239 adjacent the shank portion 242 and/or the transition surface 241 to interface with connector 250 in the insertion and engagement orientations respectively. It is noted that the head portion 243 is eccentric relative to the shank portion 242 as shown. As such, the transition surface 241 is laterally wider in certain regions of the head portion 243 and narrower in other regions of the head portion 243. Head portion 243 also includes flat 248, which serves to make the head portion 243 noncircular. Flat 248 may engage with flat 275 of the connector 250 when in the engaged orientation to limit rotation of the nipple 240 relative to the connector 250. In contrast to the embodiment of FIGS. 5a-p, where the transition surface 191 is a generally smooth circular surface surrounding the shank portion 192, transition surface 241 is more of a discontinuous circular surface that varies in lateral width and is interrupted by the key 239, which represents a lateral and longitudinal step in the transition surface 241. The nipple 240 may be made from a variety of materials known in industry, including conventional metallic nipple materials such as aluminum, brass, titanium or steel or alternative materials such as fiber reinforced polymer. Further, the nipple 240 may be monolithic as is common in industry or it may be a joined assembly of multiple components and/or portions. Spoke 200 includes a shank portion 201 that extends longitudinally along longitudinal axis 37 with a second end 207 that includes a head 202, a cylindrical outer surface 203 and transition surface 204 as shown.

Connector 250 is particularly detailed in FIG. 8b and generally includes an offset portion 256, a cylindrical portion 252 and a flange 258. Offset portion 256 includes a concave locating surface 266, an outer surface 257, an overhang 254 surface and a top face 268. Cylindrical portion 252 includes cylindrical surface 253 that extends generally along cylindrical axis 278. Overhang 254 projects generally laterally outwardly from the cylindrical surface 253. Offset portion is generally circular about offset axis 276. Locating surface 266 includes flats 275 to engage with flat 248 of the nipple 240. Flange 258 is shown to be enlarged in comparison with the cylindrical portion 252 and extends laterally outwardly from the cylindrical portion 252. Flange 258 includes retaining face 260 and optional flats 261a and 261b to facilitate manual manipulation with a wrench (not shown). Opening 270 extends through the connector 250 generally along the opening axis 271 as shown. Offset axis 276 is offset and generally parallel relative to opening axis 271 by eccentricity 277 such that outer surface 257 is eccentric relative to the shank portion 242 and to the generally cylindrical opening 270. Engagement surface 264 is pierced by opening 270. Transition surface 241 is shown to be a generally flat planar surface. The connector 250 includes recess 272 to receive key 239 during insertion and includes notch 274 to receive key 239 during engagement. The connector 150 may be made from a variety of materials well known in industry, including metallic materials such as aluminum, magnesium, zinc, brass, titanium or steel and also including reinforced polymeric materials such as fiber reinforced themoplastic or thermoset resin. Further, the connector 250 may be monolithic or it may be a joined assembly of multiple components and/or portions.

The spoke 200 is shown in the assembly sequences of FIGS. 8e-h to be loosely preassembled to the nipple 240, with shank portion 201 extending through hole 247 and head 202 adjacent top face 238. This preassembly provides the added convenience of allowing the spoke 200 to be utilized as a handle to aid in manipulating the nipple 240 and connector 250 during these assembly sequences.

FIG. 8a shows the spoke bed 70, the nipple 240, the connector 250 and the spoke 200 in exploded view prior to the subsequent assembly steps as described herein. FIG. 8e shows a first assembly step where the nipple 240 is preassembled to spoke 200 and the shank portion 242 of the nipple 240 is located within the opening 270 of the connector 250, with the head portion 243 positioned such that transition surface 241 is abutting the top face 268 and key 239 is nested and engaged to recess 272. The offset axis 276 is generally collinear with the head axis 255 and the opening axis 271 is generally collinear with the central axis 246. In this insertion orientation of the nipple 240 relative to the connector 250, the outer surface 244 is oriented to be concentric with outer surface 257 such that both the head portion 243 and offset portion 256 may pass through hole 73. Next, this pre-assembly of the spoke 200, nipple 240 and connector 250 are assembled to the spoke bed 70 in direction 280 as shown in FIG. 8f such that head portion 243 and offset portion 256 is passed through hole 73 and advanced in direction 280 such that overhang 254 is longitudinally aligned with outward surface 71. It is preferable that diameter 249 is sized to provide assembly clearance with diameter 75 to facilitate this passage. The retaining face 260 of the flange 258 now abuts the inward surface 72 and the overhang 254 is advanced in direction 280 to be just beyond the outward surface 71.

Next, with the overhang 254 now aligned with the outward surface 71, the connector 250 may be shifted laterally in direction 283 toward an engagement orientation relative to the spoke bed 70 where the cylindrical surface 253 is nested and abutting the sidewall 74 of the hole 73 as shown in FIG. 8g. It is noted that the retaining face 260 preferably extends laterally beyond the perimeter of hole 73 and therefore provides a limit stop to prevent the connector 250 from advancing too far in direction 280. The connector 250 is now locked to the spoke bed 70 along direction 280, with overhang 254 overlying and engaged to outward surface 71 and with retaining face 260 overlying and engaged to inward surface 72. The nipple 240 is also shown to be further advanced in direction 280 relative to the connector 250 until the key 239 becomes disengaged from recess 272.

Next, as shown in FIG. 8h, the pre-assembled spoke 100 and nipple 240 is then rotated by 180 degrees about the opening axis 271 in direction 284, with shank portion 242 swiveling within opening 270. This serves to re-orient the eccentric head portion 243 relative to the connector 250 such that the transition surface 241 now laterally overlaps the outward surface 71 and the key 239 is now aligned with notch 274. The central axis 246 remains collinear with the opening axis 271, while the head axis 255 is offset from the offset axis by the sum of eccentricity 259 and eccentricity 277. This orientation of the nipple 240 relative to the connector 250 may be considered as the engagement orientation of the nipple 240, which serves to increase and spread the overall lateral width 288 between the outer surface 244 of the nipple 240 and the outer surface 257 of the connector 250.

Next, as shown in FIG. 8i, the nipple 240 is withdrawn in direction 285 relative to the connector 250 and spoke bed 70, with shank portion 242 sliding longitudinally relative to opening 270 until the transition surface 241 contacts the engagement surface 264. The transition surface 241 is now bearing against the engagement surface 264 and also overlying and bearing against the outward surface 71. The outer surface 244 of the nipple 240 is now also nested, engaged and bearing against the locating surface 266 of the connector 250, with flat 248 also engaged and keyed with flats 275 and with key 239 nested and keyed with notch 274. Thus, in this engagement orientation of the nipple 240 relative to the connector 250, the nipple 240 is rotationally keyed to the connector 250 to limit independent rotation therebetween in direction 284. Further, the key 239 now abuts the sidewall 74 of hole 73 and the cylindrical surface 253 also nests and abuts against the opposing portion of the sidewall 74. Thus the key 239 and cylindrical surface 253 now bridge across the diameter 75 of hole 73 to limit any lateral shift of the nipple 240 and/or connector 250 relative to the spoke bed 70, as also particularly shown in FIG. 8p. These keyed engagements serve to maintain the spread lateral width 288 and the lateral overlap 286 and overlie engagement between the overhang 254 of the connector 250 and the spoke bed 70 as well as the overlying lateral overlap 287 and overlie engagement between the transition surface 241 of the nipple 190 and the spoke bed 70. Further, simultaneous with a portion of the transition surface 241 contacting and bearing against the outward surface 71 of the spoke bed 70, another portion of the transition surface 241 is also contacting and bearing against the engagement surface 264 of the connector 250. Also, the spoke 200 is withdrawn in direction 285 until the transition surface 204 abuts and bears against the top face 238 in an overlie engagement.

In contrast to the embodiment of FIGS. 5a-p, where the nipple 190 is laterally tilted and/or shifted to provide an overlie engagement with the spoke bed 70, the embodiment of FIGS. 8a-p show the nipple 240 as being rotated (about opening axis 271) to provide an overlie engagement with the spoke bed 70. The longitudinal axis 37 of the spoke 100 is shown to be generally parallel tot the central axis 76 of the spoke bed 70. The spoke 200 is connected and engaged with the nipple 240, which is connected and engaged to the connector 250 and to the spoke bed 270, while the connector is also connected and engaged to the spoke bed 70. It should be noted that the nipple 240 serves as an intermediate connecting element between the spoke 100 and the connector 250. These connections serve to provide a firm connection between the spoke 100 and the spoke bed 70 to support spoke tension 30 forces along the tensile axis 36. Thus, a blind connection between the spoke 100 and the spoke bed 70 is achieved. This assembly of the spoke 100, nipple 240, connector 250 and spoke bed 70 may also be disassembled in the reverse of the sequence described in FIGS. 8c-i. It may be seen that the present invention provides particular advantage in the spoke bed of a tubeless tire rim application, since the sealed tire bed (not shown) is not required to be pierced and may now be used as a sealing air barrier.

It is noted that, in contrast to the embodiment of FIGS. 5a-p, where the nipple 190 may rotate relative to the connector 150, FIGS. 8a-p is representative of an embodiment where the rotational engagement between key 239 and notch 274 and between flats 248 and 275 limit or prevent the nipple 240 from rotating relative to the connector 250 generally about the longitudinal axis 37. If required, spoke tension 30 may be adjusted at the opposed end of the spoke or by some other means known in industry. Additionally, the connector 250 may be selectively rotated about the central axis 76 with a wrench (not shown) engaged to flats 261a and 261b for proper positional alignment of the nipple 240 and spoke 200. Finally, the nipple 240 is now engaged and locked to the spoke bed 70 to support spoke tension 30 loads along the tensile axis 36.

FIGS. 8j-p are shown in cross section and describe the sequence of FIGS. 8a-i in greater detail. FIG. 8j corresponds to FIG. 8a and shows the spoke 200, nipple 240, connector 250 and spoke bed 70 in exploded view. Next, FIG. 8k corresponds to the assembly sequence of FIG. 8e and shows the spoke 200 preassembled to the nipple 240 and the nipple preassembled to the connector in the insertion orientation. Next, FIG. 8L corresponds to the assembly sequence of FIG. 8f and shows the spoke 200, nipple 240, connector 250 advanced in direction 280 relative to the spoke bed 70 such that the head portion 243 is passed through the hole 73. Next, FIG. 8m corresponds to the transition between the assembly sequence of FIG. 8f and FIG. 8g and shows the pre-assembled spoke 200, nipple 240 and connector 250 laterally shifted in direction 283 relative to the spoke bed 70 until the cylindrical surface 253 is nested with the sidewall 74. Next, FIG. 8n corresponds to the completed insertion sequence of FIG. 8g and shows the nipple 240 further advanced in direction 280 relative to the connector 250 such key is clear of recess 272. Next, FIG. 8o corresponds to the assembly sequence of FIG. 8h and shows the nipple 190 rotated about opening axis 271 by 180 degrees relative to the connector 250. Finally, FIG. 8p corresponds to the assembly sequence of FIG. 8i and shows the nipple 240 and spoke 200 withdrawn in direction 285 such that the outer surface 244 is overlapping the locating surface 266 along the longitudinal axis 37 and the transition surface 241 is engaged to both the outward surface 71 and the engagement surface 264 to resist spoke tension 30. the key is also longitudinally overlapping the sidewall 74 to restrict lateral movement of the connector 250 and nipple 240 relative to the spoke bed 270. The overhang 254 has a lateral overlap 287 with the outward surface 71 to provide an overlie engagement therebetween. Further, the transition surface 241 also has a lateral overlap 286 with the outward surface 71 to provide an overlie engagement therebetween. The connector 250 is generally shown to serve as a termination to the spoke 200 and provide means to connect or anchor the spoke 200 to a bracing element (i.e. rim and/or hub shell). Note that the span of spoke 200 is aligned in the direction of spoke tension 30 and along the tensile axis 36, which extends through the longitudinal axis 37 of the spoke 200.

FIGS. 9a-j describe an embodiment similar to the embodiment of FIGS. 5a-p, however, instead of the nipple 190 tilting into an overlie engagement between the transition surface 191 and the outward surface 71, the embodiment of FIGS. 9a-j shows a threaded connection between the sleeve 310 and the connector 340. Further, the sleeve 310 does not need to tilt or laterally shift during its installation.

Spoke 300 includes a shank portion 301 and extends along longitudinal axis 37. Sleeve 310 includes shank portion 311 with external threads 312, and a longitudinal hole 314 therethrough and extending along central axis 316, and flats 318 to create a noncircular portion that may be manually manipulated with a wrench (not shown). The spoke 300 is shown to be preassembled to the sleeve 310, with the shank portion 301 extending through the hole 314 along the central axis 316. This preassembly may be achieved by means of a variety of connecting methods known in industry, including a threaded connection, an overlie connection, an adhesively bonded connection, a monolithic combination, etc. Alternatively, the spoke 300 may remain unconnected to the sleeve 310, with the spoke 300 being joined to the sleeve 310 at a later time.

FIGS. 9a-j illustrates a blind connection between the spoke 300 and the spoke bed 70, showing the spoke bed 70, connector 340, sleeve 310 and spoke 300. Spoke bed 70 is identical to that described in FIGS. 5a-p and includes an outward surface 71, an inward surface 72 and a hole 73 therethrough with hole sidewall 74 and circular diameter 75. Hole 73 extends along central axis 76, which is shown here to be generally radial in direction. Spoke bed 70 is shown in fragmentary view for illustration purposes and it is understood that spoke bed 70 is representative to constitute a portion of a bracing element (i.e. the rim or hub flange) to which the connector 150 is connected.

Figure 9D:
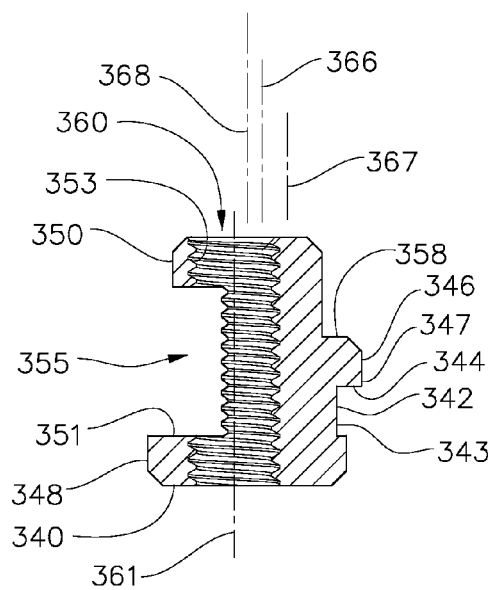

Connector 250 is particularly detailed in FIGS. 9a and 9d and generally includes a pilot portion 350, an offset portion 346, a cylindrical portion 342 and a flange 348. Offset portion 346 includes an outer surface 347, an overhang 344 and a top face 358. Cylindrical portion 342 includes cylindrical surface 343 that extends generally along cylindrical axis 366. Offset portion 346 is generally circular about offset axis 367. Flange 348 is shown to be enlarged in comparison with the cylindrical portion 342 and extends laterally outwardly from the cylindrical portion 342. Flange 348 includes retaining face 351. Cylindrical opening 360 includes internal threads 353 and extends through the connector 340 generally along the opening axis 361 as shown. Relief 355 pierces through cylindrical portion 342, offset portion 346 and a portion of pilot portion 350 as shown to expose the interior of opening 360. Offset axis 367 is offset and generally parallel and laterally offset relative to cylindrical axis 366. Pilot portion 350 is cylindrical about pilot axis 368. The connector 340 may be made from a variety of materials well known in industry, including metallic materials such as aluminum, magnesium, zinc, brass, titanium or steel and also including reinforced polymeric materials such as fiber reinforced thermoplastic or thermoset resin. Further, the connector 340 may be monolithic or it may be a joined assembly of multiple components and/or portions.

FIG. 9a shows the spoke bed 70, the sleeve 310, and the preassembled connector 340 and spoke 300 in exploded view prior to the subsequent assembly steps as described herein. FIG. 9b shows an assembly step where the connector 340 is pre-assembled to the spoke bed 70, as described in greater detail in FIGS. 9e-h, with the cylindrical portion 342 nested with hole sidewall 74 and with the overhang 344 engaged to outward surface 71 and retaining face 351 abutting inward surface 72. The cylindrical axis 366 is generally collinear with the central axis 76. Sleeve 310 and spoke 300 are shown to be aligned with opening 360 along longitudinal axis 37. Next, as shown in FIG. 9c, the sleeve 310 is threadably assembled to the connector 340 such that external threads 312 are threadably assembled to internal threads 353. Shank portion 311 is now exposed through relief 355 to contact hole sidewall 74, thus preventing the connector 340 from laterally shifting in direction 370 and thereby maintaining an overlie engagement between overhang 344 and outward surface 71 to support spoke tension 30 forces along the tensile axis 36.

Figure 9E:
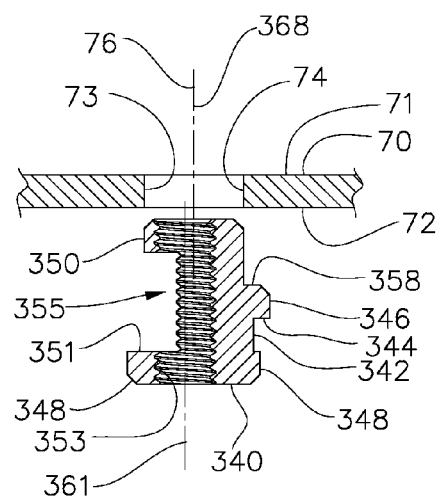
Figure 9F:
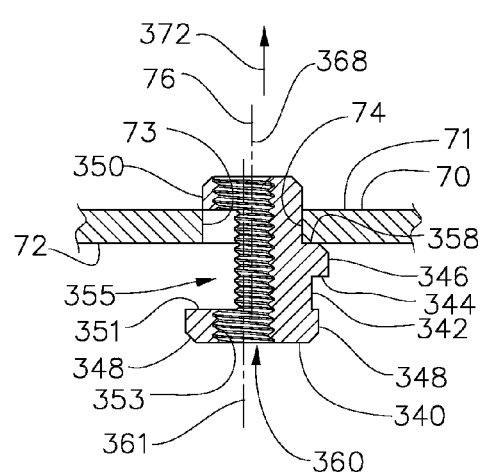
Figure 9G:
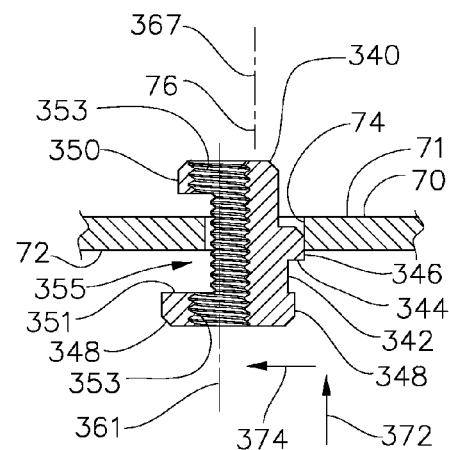
Figure 9H:
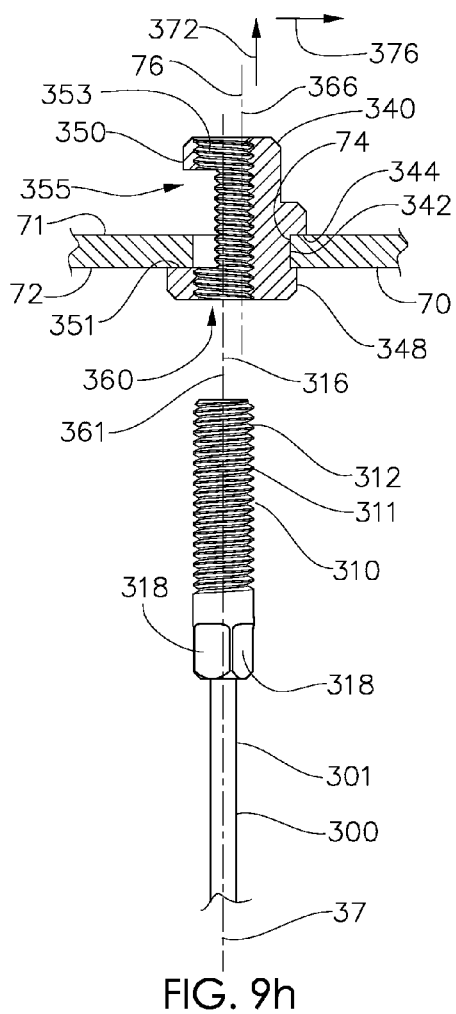

FIG. 9d shows the connector 340 in cross section, with its features more clearly detailed. FIGS. 9e-j show the spoke bed 70 and connector 340 in cross section and describe the assembly progression of FIGS. 9a-c in greater detail. FIG. 9e corresponds generally to FIG. 9a and shows the connector 340 aligned with hole 73 in preparation for the pre-assembly of the connector 340 with the spoke bed 70. Pilot portion 350 is aligned to be concentric to hole 70, with pilot axis 368 collinear with central axis 76. Next, FIG. 9f shows an initial assembly step, where the connector 340 is advanced in direction 372 such that pilot portion 350 extends within hole 73 and top face 358 abuts inward surface 72. Next, FIG. 9g shows an assembly step where the connector 340 is laterally shifted relative to spoke bed 70 in direction 374 until outer surface 347 is laterally aligned with hole sidewall 74 and offset axis 367 is now collinear with central axis 76. This lateral shift then permits the connector 340 to be further advanced in direction 372 as shown. Next, FIG. 9h shows the connector 340 further advanced in direction 372 until retaining face 351 abuts inward surface 72 and overhang 344 is longitudinally aligned with outward surface 71. With the overhang 344 clear of the hole sidewall 74, the connector 340 may now be laterally shifted in direction 376 relative to spoke bed 70 until cylindrical surface 343 laterally abuts hole sidewall 74 such that cylindrical axis 366 is collinear with central axis 76. The overhang 344 now has an overlie engagement with the outward surface 71 to engage the connector 340 to the spoke bed 70 in the longitudinally inward direction and the retaining face 351 now has an overlie engagement with the inward surface 72 to engage the connector 340 to the spoke bed 70 in the longitudinally outward direction. The pre-assembly of sleeve 310 and spoke 300 is shown to be aligned with opening 360 such that opening axis 361 is collinear with central axis 316 in preparation for the next assembly step. FIG. 9h corresponds to the assembly sequence of FIG. 9b.

Figure 9I:
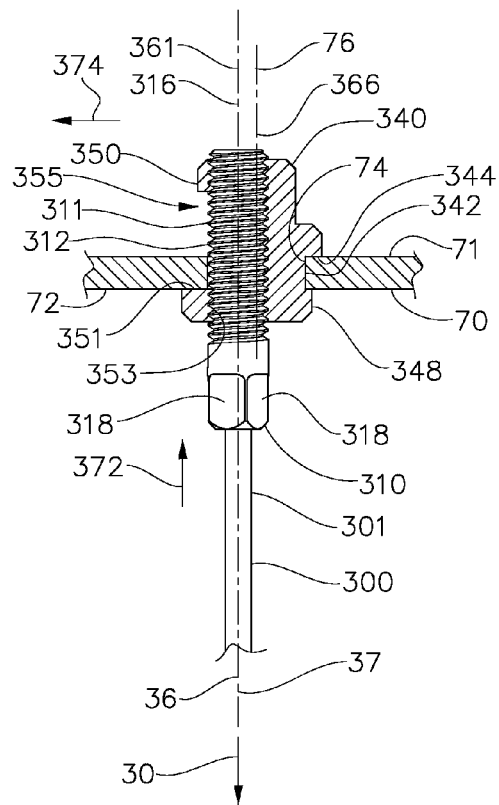
Figure 9J:
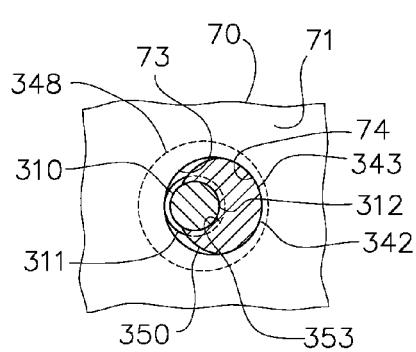

Next, as shown in FIG. 9c, the sleeve 310 is advanced in direction 372 and threadably assembled to the connector 340 such that external threads 312 are threadably engaged to internal threads 353. Shank portion 311 is now exposed through relief 355 such that it may contact hole sidewall 74. The combined lateral width of the sleeve 310 and the cylindrical portion 342 serves to bridge across the full diameter 75 of hole 73, such that the connector 340 is now blocked from shifting in direction 374, thereby maintaining the overlie engagement between overhang 344 and outward surface 71. FIGS. 9i and 9j correspond to the assembly sequence of FIG. 9c and provide further detail of the assembly between the sleeve 310, the connector 340 and the spoke bed 70. If desired, spoke tension 30 pre-load may now be adjusted in the conventional manner as previously described by threadably adjusting the external threads 312 of the sleeve 310 relative to the internal threads 353 of the connector 340 by means of a wrench (not shown) engaged to flats 318.

Thus the sleeve 310 is connected and engaged to the connector 340 and the connector 340 is connected and engaged to the spoke bed 70. It is noted that external threads 312 include laterally outwardly extending flanks that overlie and engage the corresponding laterally inwardly extending flanks of internal threads 353. These engagements serve to provide a firm connection between the spoke 300 and the spoke bed 70 to support spoke tension 30 forces along the tensile axis 36. Thus, a blind connection between the spoke 300 and the spoke bed 70 is achieved. While this blind assembled connection between the spoke 300 and the spoke bed 70 can support spoke tension 30 forces in tension, the connection may also support spoke tension forces in compression as well, with the engagement between the retaining face 351 and the inward face 72 supporting longitudinal compressive spoke loading as well. This assembly of the spoke 300, sleeve 310, connector 340 and spoke bed 70 may also be disassembled in the reverse of the sequence described in FIGS. 9e-j. It may be seen that the present invention provides particular advantage in the spoke bed of a tubeless tire rim application, since the sealed tire bed (not shown) is not required to be pierced and may now be used as a sealing air barrier.

While relief 355 is shown in FIGS. 9a-j to pierce through opening 360, the opening 360 may alternatively remain non-pierced by the relief 355. In such an alternate arrangement, the opening 360 would be surrounded by a covering of material. This covering material would preferably be sufficiently flexible to permit the covering to temporarily collapse the opening 360 during the assembly sequence shown in FIG. 9g. When the sleeve 310 is subsequently assembled to the opening 360, as shown in FIGS. 9c and 9i, this covering may be expanded to contact the hole sidewall 74. Thus, the combined lateral width of the covering, sleeve 310 and the cylindrical portion 342 serves to bridge across the full diameter 75 of hole 73 in the manner and function previously described.

Figure 9K:
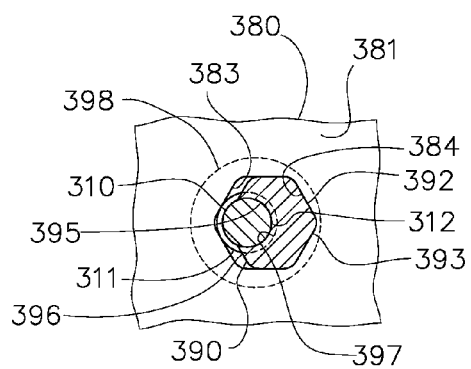
FIG. 9k is a cross section view, corresponding to FIG. 9j, showing an alternative arrangement of the embodiment of FIG. 9a, with a noncircular hole and a rotationally keyed engagement between the connector and the spoke bed about the central axis.

While the hole 73 of FIGS. 9a-j is shown to be a circular hole, the hole 73 may alternatively be a noncircular hole. In such a case, the connector may be rotationally keyed to the spoke bed to limit rotation about the central axis. Such an alternate arrangement is illustrated in FIG. 9k, where the hole 383 is noncircular and is shown to be generally hex-shaped in profile. Spoke bed 380 includes a longitudinally outward surface 381, a longitudinally inward surface (not shown) and a hole 383 therethrough with hole sidewall 384, and a hole entrance at an inward edge (not shown). Inward surface and inward edge are generally proximal the longitudinal midpoint of the span of the spoke 100, while outward surface 381 is generally opposed to the inward surface and correspondingly distal from the longitudinal midpoint of the span of the spoke 100. Hole 383 extends along central axis (not shown), which may be generally radial in direction. Spoke bed 380 is shown in fragmentary view for illustration purposes and it is understood that spoke bed 380 is representative to constitute a portion of a bracing element (i.e. the rim or hub flange) to which the connector 390 is connected. In the case shown here, the spoke bed 380 may be more closely representative of a spoke bed of a double wall rim such as the rim 120 of FIG. 4. Sleeve 310 and spoke 100 are identical to that described in FIGS. 9a-j.

Connector 390 is similar to the connector 250 of FIGS. 9a-j with the exception that the cylindrical portion 392 is faceted to create a matched surface engagement between cylindrical surface 393 and hole sidewall 384. Connector 390 generally includes a pilot portion (not shown), an offset portion (not shown) a cylindrical portion 392 and a flange portion 398. Cylindrical portion 392 includes a faceted cylindrical surface 393 that extends generally along a cylindrical axis (not shown). Flange 398 is shown to be enlarged in comparison with the cylindrical portion 392 and extends laterally outwardly from the cylindrical portion 392. Cylindrical opening 395 includes internal threads 397 and extends through the connector 390 generally along an opening axis. Relief 396 pierces through cylindrical portion 392, offset portion and a portion of pilot portion to expose the interior of opening 395. The connector 340 may be made from a variety of materials well known in industry, including metallic materials such as aluminum, magnesium, zinc, brass, titanium or steel and also including reinforced polymeric materials such as fiber reinforced thermoplastic or thermoset resin. Further, the connector 340 may be monolithic or it may be a joined assembly of multiple components and/or portions.

Connector 390 is pre-assembled to spoke bed 380 in a manner identical to that described in FIGS. 9a-j. However, when the cylindrical portion 392 is laterally shifted to nest with hole 383, the faceted cylindrical surface 394, these mating noncircular profiles become rotationally keyed and engaged to each other about the central axis of the hole 380. As such, the sleeve 310 may be threadably adjusted relative to the connector 390 as described in FIGS. 9a-j, with the added convenience where the connector 390 remains rotationally fixed to the spoke bed 380 and will not inadvertently rotate with the sleeve 380. Such a rotationally keyed engagement between the connector 390 and the spoke bed 380 about the central axis may alternatively be achieved by means of projections and/or recesses of the inward or outward surfaces that may engage corresponding projections and/or recesses in the flange portion or overhang surfaces respectively. This is in contrast to spoke bed 70, which shows inward surface 72 and outward surface 71 as being generally smooth and flat.

While my above description contains many specificities, these should not be construed as limitations on the scope of the invention, but rather as exemplifications of embodiments thereof. It is to be understood that the invention is not limited to the illustrations described and shown herein, which are deemed to be merely illustrative of the best modes of carrying out the invention, and which are susceptible of modification of form, size, and arrangement of parts and details of operation. For example:

It is also noted that geometry of connectors 150 and 250 shown in FIGS. 5a-p and FIGS. 8a-p are schematic and additional geometric features may alternatively be included in the connectors 150 and 250, the nipples 190 and 240, the spoke 100 and 200 and/or the spoke bed 70 to further enhance the assembly's function and/or its aesthetics. Further, it is envisioned that additional intermediate elements may alternatively be incorporated within this assembly to further enhance the assembly's blind engagement function.

It is shown that the transition surface 191 is shown to be a generally conical surface with conical angle that generally corresponds to the tilt angle 188. This may be the preferred arrangement since this allows the transition surface 191 to be more closely matched to the outward surface 71 of the spoke bed 70 as illustrated in FIG. 5o. However, it is also envisioned that the transition surface may alternatively have a wide range of alternate contours and shapes, including a flat planar contour that may be orthogonal to the central axis, a convex spherical contour, a concave spherical contour, a stepped or configured contour, etc.

It is shown that the nipple 190 may be rotatable about its central axis 196 relative to the connector 150. This may be preferred as this closely mimics conventional arrangements and may provide a simple means to adjust spoke tension.

However, the nipple 190 may alternatively be locked or keyed relative to the connector 150 to prevent or limit such rotation about its central axis 196 as shown in the embodiment of FIGS. 8a-p.

The threaded connection between external threads 105 of the spoke 100 and the internal threads 198 of the nipple 190 is similar to the threaded connection utilized in conventional spoke and nipple arrangements. As such, this arrangement may be preferred since these conventional components may be more easily sourced and lower in cost. However, a wide range of alternative connection means may be substituted to connect the spoke and nipple, including an overlie engagement, an adhesively bonded connection, a deformed connection, among other connection means well known in industry.

The tilt angle 188 serves to align the longitudinal axis 37 of the spoke 100 and the nipple 190 to accommodate the bracing angle and/or bias angle of the spoke 100 as previously described. This is advantageous, since it maintains the full length of the spoke 100 in generally straight alignment. Without a tilt angle, the spoke may require an offset or a bend, which often results in a region of high stress and flexing, which may also diminish the performance and longevity of the wheel. However, it is envisioned that the central axis 196 of the nipple 190 may alternatively be non-aligned with the longitudinal axis 37 and the spoke 100 may be bent at a location along its span to redirect the spoke toward its anchor points at the rim and/or hub. Further, the tilt angle may alternatively be zero, meaning that the central axis 196 of the nipple 190 and/or the longitudinal axis 37 is parallel to the central axis 76 of the hole 73.

The nipple may be regarded as an intermediate component in the connection between the spoke and the ferrule. In other words, the spoke connects to the nipple, the nipple connects to the connector, and the connector connects to the spoke bed (i.e. the rim or hub). It is envisioned that there may alternatively be additional intermediate components inserted in this chain of connection. As a further alternative, the spoke may be directly connected to the connector as illustrated in FIG. 6.

It is noted that the flats 195 of the nipple 190 and the flats 161a and 161b of the connector 150 are merely representative of associated noncircular geometry that facilitates the manual manipulation of the nipple 190 and connector 150 respectively. It is envisioned that a wide range of alternate noncircular geometries may be substituted for flats 195, 161a and 161b, including notches, holes, knurls, etc.

FIGS. 5a-p show the connector 150 component to include a flange 158 located externally and longitudinally inward of the hole 73 to which the connector is assembled. Such a flange 158 may be useful in creating an external overlie engagement with the inward surface 72 of the spoke bed 70 to control positioning of the connector 150 and also prevent the connector from inadvertently being pushed clear through the hole 73. However, it should be recognized that the primary engagement of the present invention is the engagement to resist spoke tension 30, which is in the opposite direction to this overlie engagement of the flange 158. Therefore, the flange 158 may provide a desirable convenience to aid in the assembly described herein but may not be a requirement for proper function. The present invention may still be functional without an external flange 158 of the connector.

The central axis 76 and associated sidewalls 74 of hole 73 is shown to be generally perpendicular to the inward surface 72 and outward surface 71 of the spoke bed 70. However, the central axis 76 may alternatively be at a non-orthogonal angle to the inward surface 72 and/or out board surface 71. Further, while the sidewalls 74 are shown to have a straight cylindrical contour, the sidewall may alternatively be conical or otherwise have non-parallel sidewalls.

The connector 150 component may remain stationary with respect to spoke bed 73, while the nipple may be rotated about the central axis 196 as described herein. Alternatively, the connector 150 may be permitted to rotate independently of the spoke bed 70. If so desired, this would allow the connector 150 to rotate about the central axis 57 and slip at its overlying interface with the spoke bed 70.

The embodiments described herein show a generally circular hole 73 in the spoke bed 70, with generally flat inward surface 72 and outward surface 71. The circular hole 73 may be advantageous because it may be easily and economically produced in a conventional drilling process. However, it is alternatively envisioned that the hole (73) may be non-circular and that the cylindrical portion 152 of the connector 150 may have mating non-circular geometry that will provide a rotationally keyed engagement between the connector 150 and the spoke bed 70. Additionally or alternatively, the nipple 190 may mate with the non-circular hole (73) to provide rotational keying between the nipple 190 and/or the connector 150 and the hole (73). Further, it is alternatively envisioned that the inward surface 72 and/or outward surface 71 of the spoke bed 70 may be non-flat and employ a configured surface with projections and/or recesses. The mating flange 158 and/or overhang 154 of the connector 150 may include mating configured geometry that will provide a rotationally keyed engagement between the connector 150 and these projections and/or recesses of the spoke bed 70. As a further alternative, the inward surface 72 and/or outward surface 71 of spoke bed 70 may have a wide range of shapes and profiles, including a convex profile, a concave profile, a ribbed or stepped profile, etc. In such a case, it may be advantageous for the overhang 154 of the connector 150 and/or the transition surface 191 of the nipple 190 to employ geometry that mates and/or engages with such a non-flat spoke bed geometry.

The embodiments described herein show a blind connection with a blind hole through which the connector 150 is connected. However the present invention may prove to be advantageous to achieve such a blind connection even in arrangements where the hole itself is not a blind hole and there is access to the opposite end of that hole.

The embodiments described herein may generally show a surface-to-surface overlie engagement between the overhang 154 of the connector 150 and the outward surface 71 of the spoke bed. However, it is also envisioned that this overlie engagement may include a surface-to-edge engagement, where the overhang 154 engages the outward edge 77 of hole 73.

The embodiments described herein show the outward surface 71 to be generally planar and the overlap 186 interface between the overhang 154 and the outward surface 71 to be generally coplanar with the overlap 187 interface between the transition surface 191 and the outward surface 71. However, it is alternatively envisioned that the outward surface 71 be contoured and non-planar and that the overlap 186 interface may be longitudinally or otherwise offset from the overlap 187 interface.

Accordingly, the scope of the invention should be determined not by the embodiments illustrated, but is instead intended to encompass all such modifications that are within its spirit and scope as defined by the claims.

What is claimed is:
1. A vehicle wheel, comprising:
a peripheral wheel rim;
a central hub with a central axle and an outer flange;

a plurality of spokes extending between said rim and said hub with a first portion connected to said rim and a second portion opposed to said first portion and connected to said hub, and a span portion extending between said rim and said hub, wherein each of said spokes is a generally slender element with a length greater than its width and longitudinal axis along its length and a tensile axis of applied tensile load along said span portion;

a bracing element including a spoke bed portion with a hole therein including a hole axis, a hole entrance, a hole sidewall, and at least one of an engagement surface and an engagement edge adjacent said hole and longitudinally outward of said hole entrance;

a connecting element connected to said bracing element, including a generally laterally projecting overhang portion;

wherein said bracing element comprises at least a portion of at least one of said rim and said outer flange;

wherein said connecting element may be laterally displaced relative to said bracing element between a first lateral position and a second lateral position, wherein said connecting element may pass within said hole in said first lateral position, and wherein, in said second lateral position, said overhang portion is engaged to at least one of said engagement surface and said engagement edge in a first overlie engagement to limit longitudinally inward displacement of said connecting element relative to said bracing element;

wherein, with said connecting element in said second lateral position, a spoke element comprising at least one of (i) a corresponding spoke of said plurality of spokes, and (ii) an intermediate connecting element structurally coupled to said spoke, is directly engaged to an engaging surface of said connecting element in a second overlie engagement longitudinally outward of said hole entrance; and wherein, with said connecting element in said second lateral position, said spoke element is laterally positioned between said connecting element and said hole to limit lateral displacement of said connecting element and to maintain said connecting element in said second lateral position.

2. A wheel according to claim 1, wherein said wheel is a tension spoke wheel including pre-tensioned spokes.

3. A wheel according to claim 1, wherein said spoke element is connected to said bracing element by means of a blind connection wherein said spoke element may be connected to said bracing element without requiring access to the longitudinally outward surface of said spoke bed portion.

4. A wheel according to claim 1, wherein a portion of said connecting element is laterally abutting said hole sidewall in said second lateral position.

5. A wheel according to claim 1, wherein, with said connecting element in said second lateral position, said spoke element is simultaneously directly engaged to said bracing element in a third overlie engagement to limit longitudinally inward displacement of said spoke relative to said bracing element.

6. A wheel according to claim 5, wherein said spoke includes a laterally extending transition surface, and wherein said second overlie engagement and said third overlie engagement occur at said transition surface and within separate regions of said transition surface.

7. A wheel according to claim 6, wherein said second overlie engagement occurs at a first region of said transition surface and said third overlie engagement occurs at a second region of said transition surface and wherein said first region is generally opposed to said second portion about said longitudinal axis.

8. A wheel according to claim 1, wherein said spoke element includes a laterally extending transition surface and a shank portion longitudinally inward of said transition surface and wherein said shank portion is positioned between said connecting element and said hole to maintain said connecting element in said second lateral position.

9. A wheel according to claim 1, wherein said spoke element includes a laterally extending transition surface and wherein said spoke has an insertion orientation and an engagement orientation relative to said connecting element and wherein said spoke element may pass through said hole in said insertion orientation and wherein said transition surface overlies said at least one of said engagement surface and said engagement edge in said engagement orientation.

10. A wheel according to claim 9, including a generally lateral displacement of said spoke element relative to said connecting element between said insertion orientation and said engagement orientation, wherein at least a portion of said spoke element is laterally proximal relative to said connecting element in said insertion orientation and laterally distal relative to said connecting element in said engagement orientation.

11. A wheel according to claim 10, wherein said lateral displacement of said spoke element includes a lateral tilt of said spoke element, wherein said longitudinal axis has a non-parallel tilt angle relative to said hole axis.

12. A wheel according to claim 9, including rotational displacement of said spoke element about said longitudinal axis between said insertion orientation and said engagement orientation, wherein the combined lateral width of said spoke element and said connector is laterally contracted in said insertion orientation and laterally expanded in said engagement orientation.

13. A wheel according to claim 9, wherein said connecting element includes a generally longitudinal opening therethrough, wherein said spoke element extends through said opening, and wherein said opening includes sufficient clearance relative to said spoke element to accommodate a lateral shift of said spoke element relative to said connecting element between said insertion orientation and said engagement orientation.

14. A wheel according to claim 1, wherein said spoke includes a laterally extending transition surface and wherein said transition surface is directly in said spoke.

15. A wheel according to claim 1, wherein said spoke element includes a laterally extending transition surface and wherein said transition surface is in said intermediate connecting element.

16. A wheel according to claim 15, wherein said intermediate connecting element is a spoke nipple, that includes a shank portion longitudinally inward of said transition surface.

17. A wheel according to claim 15, wherein said intermediate connecting element is connected to said spoke by means of a threaded engagement along a longitudinal engagement axis.

18. A wheel according to claim 17, wherein said threaded engagement may be threadably adjusted to selectively adjust the length of said span portion.

19. A wheel according to claim 1, wherein said spoke element may be rotated about said longitudinal axis relative to said connecting element.

20. A wheel according to claim 15, wherein said intermediate connecting element extends through said hole to be longitudinally inward of said entrance.

21. A wheel according to claim 1, wherein said spoke element includes noncircular geometry to facilitate manual manipulation of the associated one of said spoke and said intermediate connecting element.

22. A wheel according to claim 1, wherein said spoke element includes shank portion and a laterally extending transition surface and wherein said transition surface is a circular transition surface that continuously circumscribes said shank portion about said longitudinal axis.

23. A wheel according to claim 22, wherein said spoke element includes a laterally abutting engagement between said outer surface and said connecting element.

24. A wheel according to claim 22, wherein said outer surface has a generally circular cylindrical surface and said shank portion has a generally circular cylindrical surface and wherein said outer surface is concentric with said shank portion about said longitudinal axis.

25. A wheel according to claim 22, wherein said outer surface has a generally circular cylindrical surface and said shank portion has a generally circular cylindrical surface and wherein said outer surface is eccentric with said shank portion about said longitudinal axis.

26. A wheel according to claim 1, wherein said spoke element includes shank portion and includes a laterally extending transition surface and wherein said transition surface discontinuously surrounds said shank portion about said longitudinal axis.

27. A wheel according to claim 1, wherein said spoke element includes a laterally extending transition surface with an outer surface longitudinally adjacent the laterally outward periphery of said transition surface and a shank portion longitudinally and laterally inward of said transition surface.

28. A wheel according to claim 1, wherein said connecting element extends longitudinally inward of said entrance.

29. A wheel according to claim 28, wherein said connecting element includes a flange portion located longitudinally inward of said entrance that extends laterally outward of said entrance.

30. A wheel according to claim 29, wherein said flange portion includes noncircular geometry and wherein said noncircular geometry facilitates manual manipulation of said connecting element.

31. A wheel according to claim 1, wherein said bracing element is said rim, including a spoke bed portion that includes said hole, and an outer wall portion located longitudinally outward of said spoke bed portion, and an internal cavity between said spoke bed portion and said outer wall portion, and wherein said hole is obscured by said outer wall portion.

32. A wheel according to claim 1, wherein said hole is a circular hole.

33. A wheel according to claim 1, wherein said connecting element may be rotated relative to said bracing element about said hole axis.

34. A wheel according to claim 1, wherein said hole of said bracing element is a non-circular hole.

35. A wheel according to claim 1, wherein said connecting element is rotationally keyed to said bracing element to limit rotation of said connecting element relative to said bracing element about said hole axis.

36. A wheel according to claim 1, wherein said second overlie engagement includes a helical thread engagement between said spoke element and said connector.

37. A wheel according to claim 36, wherein said helical thread engagement is between external threads of said spoke element and internal threads of said connecting element.

38. A wheel according to claim 1, wherein said connecting element includes a generally longitudinal opening therethrough and wherein said spoke element extends through said opening.

39. A wheel according to claim 1, wherein said connector is a singular unitary element that includes (i) said overhang portion and (ii) said engaging surface of said connecting element.

40. A wheel according to claim 1, wherein, with said connecting element in said first lateral position, both said connecting element and said spoke element may simultaneously pass within said hole.

41. A wheel according to claim 1, wherein said second overlie engagement is a structural engagement that serves to limit longitudinal displacement of said spoke element relative to said bracing element.

42. A vehicle wheel, comprising:
a peripheral wheel rim;
a central hub with a central axle and an outer flange;
a plurality of spokes extending between said rim and said hub, each spoke comprising a first portion connected to said rim, a second portion opposed to said first portion and connected to said hub, and a span portion extending between said rim and said hub, wherein each of said spokes is a generally slender element with a length greater than its width and a longitudinal axis along its length and a tensile axis of applied tensile load along said span portion
a bracing element including a spoke bed portion with hole therein including a hole axis, a hole entrance, a hole sidewall, and at least one of an engagement surface and an engagement edge adjacent said hole and longitudinally outward of said hole entrance;
a connecting element connected to said bracing element, including a generally laterally projecting overhang portion and an opening;
wherein a spoke element, comprised of at least one of (i) a corresponding spoke of said plurality of spokes, and (ii) an intermediate connecting element structurally coupled to said spoke, has an enlarged head portion defining a laterally extending transition surface;
wherein said bracing element comprises at least a portion of at least one of said rim and said outer flange;
wherein said connecting element may be laterally displaced relative to said bracing element between a first lateral position and a second lateral position, wherein said connecting element may pass within said hole in said first lateral position and wherein, in said second lateral position, said overhang portion is engaged to at least one of said engagement surface and said engagement edge in a first overlie engagement to limit longitudinally inward displacement of said connecting element relative to said bracing element;
wherein said laterally extending transition surface of said spoke element simultaneously contacts at least one of said engagement surface and said engagement edge, and said connecting element in an overlie engagement to maintain said connecting element in said second lateral position; and
wherein, with said connecting element in said second lateral position, said opening of said connecting element provides clearance for said spoke element to tilt laterally relative to the connector and to the hole axis such that the spoke tension presses said transition surface to directly bear against said connecting element and the at least one of said engagement surface and said engagement edge to support spoke tension forces.

* * * * *